(12) United States Patent
Akihisa et al.

(10) Patent No.: US 7,997,247 B2
(45) Date of Patent: Aug. 16, 2011

(54) ENGINE INTAKE CONTROL SYSTEM

(75) Inventors: Hiroki Akihisa, Saitama (JP); Tsutomu Tsukii, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 393 days.

(21) Appl. No.: 12/133,174

(22) Filed: Jun. 4, 2008

(65) Prior Publication Data
US 2008/0295793 A1 Dec. 4, 2008

(30) Foreign Application Priority Data

Jun. 4, 2007 (JP) ................................ 2007-148545
Jun. 4, 2007 (JP) ................................ 2007-148546

(51) Int. Cl.
F02M 35/10 (2006.01)
(52) U.S. Cl. .......... 123/184.56; 123/184.21; 123/184.53
(58) Field of Classification Search ............. 123/184.21, 123/184.51–184.57, 184.61
See application file for complete search history.

(56) References Cited

U.S. PATENT DOCUMENTS

| | | | |
|---|---|---|---|
| 4,617,897 A | | 10/1986 | Sasaki et al. |
| 4,726,329 A | * | 2/1988 | Atkin ........................ 123/184.34 |
| 4,854,270 A | | 8/1989 | Melde-Tuczai et al. |
| 5,033,417 A | * | 7/1991 | van Basshuysen et al. .................... 123/406.29 |
| 5,813,380 A | * | 9/1998 | Takahashi et al. ........ 123/184.55 |
| 6,446,591 B1 | * | 9/2002 | Chae et al. ................ 123/184.61 |
| 7,726,272 B2 | * | 6/2010 | Kitadani et al. ......... 123/184.53 |
| 2005/0279312 A1 | * | 12/2005 | Park .......................... 123/184.53 |

FOREIGN PATENT DOCUMENTS

| | | |
|---|---|---|
| DE | 3830286 A1 | 3/1989 |
| DE | 202005012790 U1 | 2/2007 |
| EP | 0201180 A1 | 11/1986 |

(Continued)

OTHER PUBLICATIONS

European Search Report for Application No. 09154883, dated Apr. 17, 2009.

(Continued)

*Primary Examiner* — Michael Cuff
*Assistant Examiner* — Hung Q Nguyen
(74) *Attorney, Agent, or Firm* — Nelson Mullins Riley & Scarborough LLP; Anthony A. Laurentano

(57) ABSTRACT

A valve plate is formed as a butterfly-type valve plate including a first and a second valve-plate half portions that extend in opposite directions to each other from a valve shaft. When the valve plate is at a first changeover position, the first valve-plate half portion is directed to the downstream side of a first intake passage from the valve shaft and the second valve-plate half portion is directed to the upstream side of the first intake passage from the valve shaft so that a first plate face of the valve plate forms a part of the first intake passage. When the valve plate is at a second changeover position, the first valve-plate half portion is directed to the downstream side of a second intake passage from the valve shaft and the second valve-plate half portion is directed to the upstream side of the second intake passage from the valve shaft so that a second plate face of the valve plate forms a part of the second intake passage. Accordingly, the power needed for changing over the valve plate and for keeping a predetermined changeover position can be reduced significantly.

11 Claims, 19 Drawing Sheets

FOREIGN PATENT DOCUMENTS

| | | |
|---|---|---|
| EP | 1428998 | 6/2004 |
| EP | 1498589 A2 | 1/2005 |
| FR | 1395660 | 4/1965 |
| FR | 002591665 A1 * | 6/1987 |
| JP | 2-85828 | 7/1990 |
| JP | 404132869 * | 5/1992 |
| JP | 2000-234522 | 8/2000 |
| JP | 2005-127252 | 5/2005 |
| JP | 2006-299951 | 11/2006 |
| JP | 2006307758 A * | 11/2006 |
| JP | 2007-9883 | 1/2007 |
| JP | 2008-298043 | 12/2008 |
| WO | WO-93/00505 A2 | 1/1993 |
| WO | WO-2004/033870 A1 | 4/2004 |

OTHER PUBLICATIONS

European Search Report for Application No. EP 08 01 0196, dated Aug. 19, 2008.

Eiser, Axel et al., "Die Neuen V6-Ottomotoren," ATZ MTZ (2004).

European Office Action for Application No. 09154883.4, dated Oct. 8, 2010.

Japanese Office Action for Application No. 2007-148545, dated Mar. 16, 2011.

Japanese Office Action for Application No. 2007-148546, dated Mar. 16, 2011.

* cited by examiner

ENGINE INTAKE CONTROL SYSTEM

BACKGROUND OF THE INVENTION

1. Field of the Invention

The present invention relates to an engine intake control system comprising: an intake passage body attached to an engine; a first intake passage formed in the intake passage body and having a downstream end connected to an intake port of the engine; a second intake passage also formed in the intake passage body and having a downstream end connected to the intake port; and a changeover valve that includes a valve shaft rotatably supported by the intake passage body, and a valve plate attached to the valve shaft, the valve plate being moved rotationally, by a rotational movement of the valve shaft, between a first changeover position, where the valve plate closes the second intake passage and allows the first intake passage to be connected to the intake port for air flow, and a second changeover position, where the valve plate closes the first intake passage and allows the second intake passage to be connected to the intake port for air flow.

2. Description of the Related Art

The above-mentioned engine intake control system has been known by the disclosure of Japanese Patent Application Laid-open No. 2000-234522.

The engine intake control system disclosed in the above-mentioned document employs a changeover valve that includes a valve shaft and a valve plate. The valve plate is attached to the valve shaft and extends in the direction of only one side of the valve shaft. In other words, the valve plate is cantilevered. A moment of a constant direction caused by the intake negative pressure acts on the valve plate irrespective of whether the valve plate is positioned at a first changeover position or a second changeover position. Operating the valve plate to change its positions against the above-mentioned moment needs a large power, so does keeping the valve plate at a predetermined changeover position against the moment.

SUMMARY OF THE INVENTION

The present invention, made in view of the above-mentioned circumstances, aims to provide an engine intake control system to address the above-described problems. To be more specific, while the air intake control system employs a rotationally-moving valve plate, the system is capable of reducing, to a great extent, the power needed for operating the valve plate to change its positions or for keeping the valve plate at a predetermined changeover position.

In order to achieve the object, according to a first feature of the present invention, there is provided an engine intake control system comprising: an intake passage body attached to an engine; a first intake passage formed in the intake passage body and having a downstream end connected to an intake port of the engine; a second intake passage also formed in the intake passage body and having a downstream end connected to the intake port; and a changeover valve that includes a valve shaft rotatably supported by the intake passage body, and a valve plate attached to the valve shaft, the valve plate being moved rotationally, by a rotational movement of the valve shaft, between a first changeover position, where the valve plate closes the second intake passage and allows the first intake passage to be connected to the intake port for air flow, and a second changeover position, where the valve plate closes the first intake passage and allows the second intake passage to be connected to the intake port for air flow, wherein the valve plate is a butterfly-type valve plate including first and second valve-plate half portions that extend in opposite directions to each other from the valve shaft, when the valve plate is at the first changeover position, a plate face, which is at one side of the valve plate, forms a part of the first intake passage, and when the valve plate is at the second changeover position, a plate face, which is at the other side of the valve plate, forms a part of the second intake passage.

According to a second feature of the present invention, in addition to the first feature, when the valve plate is at the first changeover position, the first valve-plate half portion is directed to the downstream side of the first intake passage from the valve shaft and the second valve-plate half portion is directed to the upstream side of the first intake passage from the valve shaft so that the plate face, which is at one side of the valve plate, forms a part of the first intake passage, and when the valve plate is at the second changeover position, the first valve-plate half portion is directed to the downstream side of the second intake passage from the valve shaft and the second valve-plate half portion is directed to the upstream side of the second intake passage from the valve shaft so that the plate face, which is at the other side of the valve plate, forms a part of the second intake passage.

With a first and a second features of the present invention, in both of the cases where only the first intake passage is connected to the intake port for air flow by moving rotationally the valve plate to the first changeover position and where only the second intake passage is connected to the intake port for air flow by moving rotationally the valve plate to the second changeover position, the direction of moment around the valve shaft exerted on the first valve-plate half portion by the intake negative pressure of the engine and the direction of the moment around the valve shaft exerted on the second valve-plate half portion by the same negative pressure are opposite to each other. Accordingly, the two moments cancel out each other. Zero or a significantly reduced moment that acts on the valve shaft is the outcome of the canceling out. As a consequence, only a small power is needed to keep the valve plate at each of the changeover positions, and only a small drive torque is needed to move rotationally the valve plate for the purpose of changing its positions.

According to a third feature of the present invention, in addition to the first feature, the intake passage body includes at least two separate blocks, which are a first block and a second block, a surge chamber with an air entrance being formed on a side thereof is formed in the first block, an upstream-side half portion of the first intake passage with an opening facing the surge chamber at an upstream end thereof is formed in the first block, a downstream-side half portion of the first intake passage is formed in the second block, the valve shaft is attached to the second block, a third block including the second intake passage is disposed contiguously to the second block, the upstream end of the second intake passage being open to the surge chamber and the downstream end of the second intake passage being open to the downstream-side half portion of the first intake passage, and the valve plate closes the downstream end of the second intake passage when located at the first changeover position, and closes the downstream-side half portion of the first intake passage when located at the second changeover position.

With the third feature of the present invention, the surge chamber, the first intake passage, and the second intake passage can be easily formed in the intake passage body. In addition, the first, the second, and the third blocks can be made of materials that suit their respective functions.

According to a fourth feature of the present invention, in addition to the third feature, a valve seat with which the first valve-plate half portion is in contact when the valve plate is at the first changeover position is formed in the third block, and a valve seat with which the second valve-plate half portion is in contact when the valve plate is at the second changeover position is formed in the third block. The valve seat with which the first valve-plate half portion is in contact when the valve plate is at the first changeover position corresponds to a first valve seat 23a in the embodiments of the present invention that will be described later, and the valve seat with which the second valve-plate half portion is in contact when the valve plate is at the second changeover position corresponds to a fourth valve seat 23d.

With the fourth feature of the present invention, when the valve plate is at the first changeover position, the first valve-plate half portion is in contact with the corresponding valve seat. Accordingly, the air is prevented from leaking from the second intake passage to the first intake passage. Higher charging efficiency can be achieved by making effective use of the intake inertia effect. Higher output performance of the engine can be achieved for the low-speed range. In addition, when the valve plate is at the second changeover position, the second valve-plate half portion is in contact with the corresponding valve seat. Accordingly, the air is prevented from leaking from the first intake passage to the second intake passage. Higher charging efficiency can be achieved by making effective use of the pulsation effect of the intake air. Higher output performance of the engine can be achieved for the high-speed range. Moreover, the valve seats can be formed easily in the third block.

According to a fifth feature of the present invention, in addition to the third feature, a valve seat with which the second valve-plate half portion is in contact when the valve plate is at the first changeover position is formed both in the second block and in the third block, and a valve seat with which the first valve-plate half portion is in contact when the valve plate is at the second changeover position is formed in the second block. The valve seat with which the second valve-plate half portion is in contact when the valve plate is at the first changeover position corresponds to a second valve seat 23b in the embodiments of the present invention that will be described later, and the valve seat with which the first valve-plate half portion is in contact when the valve plate is at the second changeover position corresponds to a third valve seat 23c.

With the fifth feature of the present invention, when the valve plate is at the first changeover position, the second valve-plate half portion is in contact with the corresponding valve seat. Accordingly, the air is prevented from leaking from the second intake passage to the first intake passage. Higher charging efficiency can be achieved by making effective use of the intake inertia effect. Higher output performance of the engine can be achieved for the low-speed range. In addition, when the valve plate is at the second changeover position, the first valve-plate half portion is in contact with the corresponding valve seat. Accordingly, the air is prevented from leaking from the first intake passage to the second intake passage. Higher charging efficiency can be achieved by making effective use of the pulsation effect of the intake air. Higher output performance of the engine can be achieved for the high-speed range. Moreover, the valve seats can be formed easily in the second block and in third block.

According to a sixth feature of the present invention, in addition to the third feature, a funnel member is provided to form the downstream end of the second intake passage, and the funnel member forms a part of the third block.

With the sixth feature of the present invention, the second intake passage equipped with the funnel can be formed easily in the third block.

According to a seventh feature of the present invention, there is provided an engine intake control system comprising: an intake passage body attached to an engine; a first intake passage formed in the intake passage body and having a downstream end connected to an intake port of the engine; a second intake passage formed in the intake passage body and having a downstream end connected to the intake port; and a changeover valve that includes a valve shaft rotatably supported by the intake passage body, and a valve plate attached to the valve shaft, the valve plate being moved rotationally, by a rotational movement of the valve shaft, between a first changeover position, where the valve plate closes the second intake passage and allows the first intake passage to be connected to the intake port for air flow, and a second changeover position, where the valve plate closes the first intake passage and allows the second intake passage to be connected to the intake port for air flow, wherein the valve plate is a butterfly-type valve plate including first and second valve-plate half portions that extend in opposite directions to each other from the valve shaft, when the valve plate is at the first changeover position, a first plate face, which is at one side of the valve plate, forms a part of the first intake passage, and when the valve plate is at the second changeover position, a second plate face, which is at the other side of the valve plate, forms a part of the second intake passage, a first valve seat with which a sealing portion located on the second plate face side of the first valve-plate half portion is in contact when the valve plate is at the first changeover position is formed in the intake passage body, a second valve seat with which a sealing portion located on the first plate face side of the second valve-plate half portion is in contact when the valve plate is at the first changeover position is formed in the intake passage body, a third valve seat with which a sealing portion located on the first plate face side of the first valve-plate half portion is in contact when the valve plate is at the second changeover position is formed in the intake passage body, a fourth valve seat with which a sealing portion located on the second plate face side of the second valve-plate half portion is in contact when the valve plate is at the second changeover position is formed in the intake passage body, and in at least one of the first valve-plate half portion and the second valve-plate half portion, the sealing portion located on the first plate face side and the sealing portion located on the second plate face side are separated from each other in the thickness direction of the valve plate.

According to an eighth feature of the present invention, in addition to the seventh feature, when the valve plate is at the first changeover position, the first valve-plate half portion is directed to the downstream side of the first intake passage from the valve shaft and the second valve-plate half portion is directed to the upstream side of the first intake passage from the valve shaft so that the first plate face, which is at one side of the valve plate, forms a part of the first intake passage, and when the valve plate is at the second changeover position, the first valve-plate half portion is directed to the downstream side of the second intake passage from the valve shaft and the second valve-plate half portion is directed to the upstream side of the second intake passage from the valve shaft so that the second plate face, which is at the other side of the valve plate, forms a part of the second intake passage.

With the seventh and the eighth features of the present invention, in a case where the valve plate is moved rotationally to the first changeover position, the sealing portion located on the second plate face side of the first valve-plate half portion is in contact with the first valve seat, and the sealing portion located on the first plate face side of the second valve-plate half portion is in contact with the second valve seat. Accordingly, the second intake passage is closed, and the first intake passage is connected to the intake port for the air flow. Alternatively, in a case where the valve plate is moved rotationally to the second changeover position, the sealing portion located on the first plate face side of the first valve-plate half portion is in contact with the third valve seat, and the sealing portion located on the second plate face side of the second valve-plate half portion is in contact with the fourth valve seat. Accordingly, the first intake passage is closed, and the second intake passage is connected to the intake port for the air flow. In both of the above-mentioned cases, the direction of moment around the valve shaft exerted on the first valve-plate half portion by the intake negative pressure of the engine and the direction of the moment around the valve shaft exerted on the second valve-plate half portion by the same negative pressure are opposite to each other. Accordingly, the two moments cancel out each other. Zero or a significantly reduced moment that acts on the valve shaft is the outcome of the canceling out. As a consequence, only a small power is needed to keep the valve plate at each of the changeover positions, and only a small drive torque is needed to move rotationally the valve plate for the purpose of changing its positions.

In addition, in at least one of the first valve-plate half portion and the second valve-plate half portion, the sealing portion located on the first plate face side and the sealing portion located on the second plate face side are separated from each other in the thickness direction of the valve plate. Accordingly, the angle needed for changing the positions of the valve plate between the first and the second changeover positions can be made as small as possible by the amount corresponding to the in-between separation distance. As a consequence, quicker response in the changing-over of the positions can be expected.

According to a ninth feature of the present invention, in addition to the seventh feature, the sealing portion located on the first plate face side of the first valve-plate half portion is formed by a first seal lip made of an elastic material, the first seal lip being formed in the peripheral edge portion of the first plate face of the first valve-plate half portion, the sealing portion located on the second plate face side of the first valve-plate half portion is formed by a second seal lip made of an elastic material, the second seal lip being formed in the peripheral edge portion of the second plate face of the first valve-plate half portion, the sealing portion located on the first plate face side of the second valve-plate half portion is formed by a third seal lip made of an elastic material, the third seal lip being formed in the peripheral edge portion of the first plate face of the second valve-plate half portion, and the sealing portion located on the second plate face side of the second valve-plate half portion is formed by a fourth seal lip made of an elastic material, the fourth seal lip being formed in the peripheral edge portion of the second plate face of the second valve-plate half portion.

With the ninth feature of the present invention, when the valve plate is moved rotationally to the first changeover position so as to close the second intake passage and to make the first intake passage be connected to the intake port for air flow, the contact of the second seal lip of the first valve-plate half portion with the first valve seat and the contact of the fourth seal lip of the second valve-plate half portion with the second valve seat help to reliably prevent the air from leaking from the second intake passage to the first intake passage. Alternatively, when the valve plate is moved rotationally to the second changeover position so as to close the first intake passage and to make the second intake passage be connected to the intake port for air flow, the contact of the first seal lip of the first valve-plate half portion with the third valve seat and the contact of the fourth seal lip of the second valve-plate half portion with the fourth valve seat help to reliably prevent the air from leaking from the second intake passage to the first intake passage.

According to a tenth feature of the present invention, in addition to the seventh feature, a tapered flow-straitening protrusion is formed at any one of the tip-end portion of the first valve-plate half portion and the tip-end portion of the second valve-plate half portion in which the two sealing portions located respectively on the first plate face side and on the second plate face side are separated from each other, the tip-end portions being the remotest part from the valve shaft, and the tapered flow-straightening protrusion is in contact with or positioned close to the inner face of the corresponding intake passage when the valve plate is at any one of the first and the second changeover positions.

With the tenth feature of the present invention, the tapered flow-straightening protrusion is provided at any one of the tip-end portion of the first valve-plate half portion and at the tip-end portion of the second valve-plate half portion in which the two peripheral edge portions—one on the first plate face side and the other on the second plate face side—are separated from each other. The provision of the flow-straightening protrusion helps to prevent the thickly-made tip-end portion of the valve plate from causing turbulence of the intake air flow irrespective of whether the valve plate is in its first changeover position or in its second changeover position. Accordingly, higher intake efficiency of the engine can be achieved.

According to an eleventh feature of the present invention, in addition to the seventh feature, the peripheral edge portions, serving as the sealing portion, of at least one of the first plate face and the second plate face are joined together at one side of the valve plate so as to be contiguous from each other.

With the eleventh feature of the present invention, the peripheral edge portions of the first plate face and the second plate face that are contiguous to each other at one side of the valve plate are brought into contact with the inner face of the corresponding intake passage. Accordingly, the air is prevented from leaking though the portion around the valve shaft.

The intake passage body corresponds to an intake manifold M in the embodiments of the present invention that will be described later. In addition, the first intake passage corresponds to a first intake passage 4, while the second intake passage corresponds to a second intake passage 5.

The above-mentioned and other objects, characteristics, and advantageous effects of the present invention will be clearly understood by the following descriptions of some preferred embodiments of the present invention given with reference to the accompanying drawings.

DESCRIPTION OF THE PREFERRED EMBODIMENTS

Preferred embodiments of the present invention will be described below with reference to the accompanying drawings.

Figure 1:
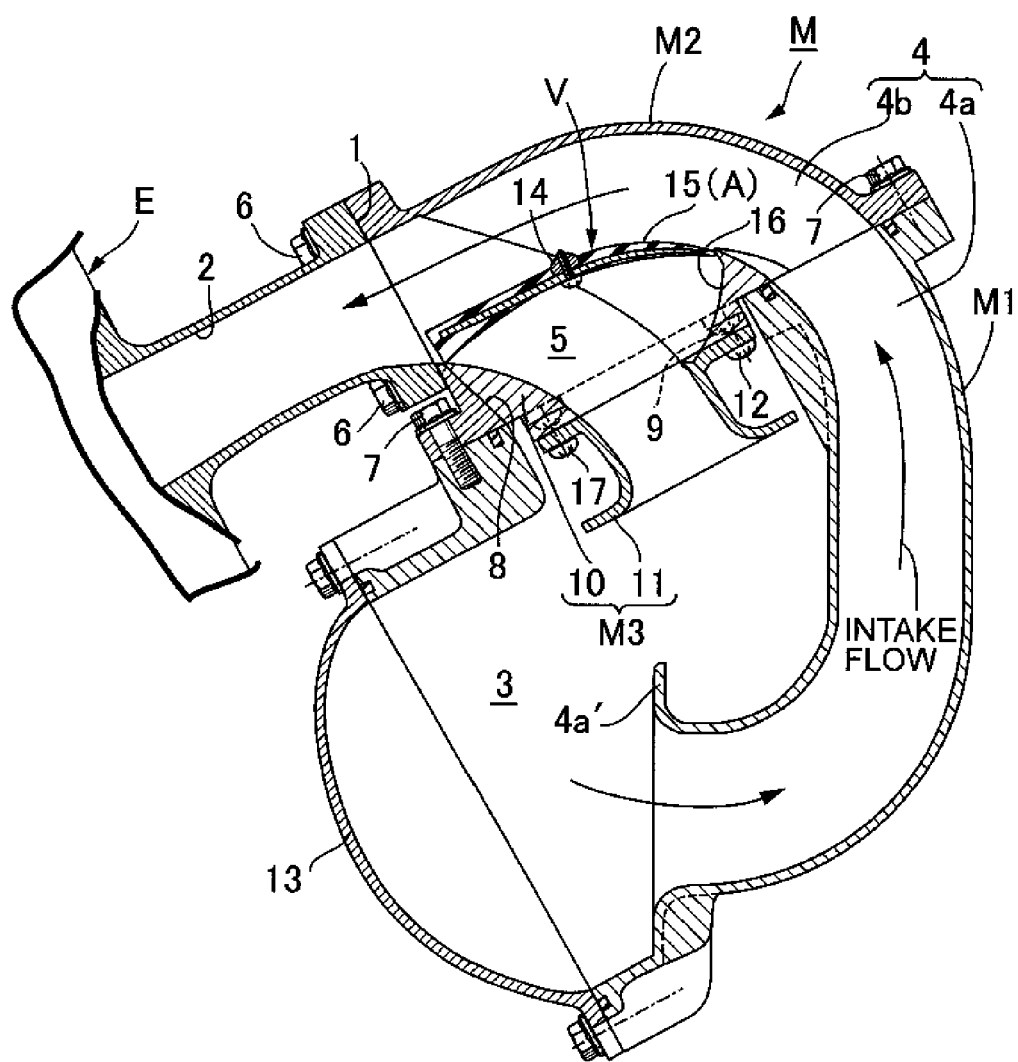
FIG. 1 is a side view of a vertical section of an intake manifold equipped with an intake control system, assembled to the engine, according to a first embodiment of the present invention.

Firstly, referring to FIG. 1, a manifold-attachment face 1 is formed in a cylinder head of a multi-cylinder (the example of the figure has four cylinders) engine E. Plural intake ports 2 have their openings formed in the manifold-attachment face 1. An intake manifold M is fastened to the manifold-attachment face 1 with plural bolts 6 and distributes the air that is taken in to the intake ports 2. Here, one thing has to be mentioned as to the directions—front-and-rear as well as right-and-left—related to the intake manifold M. The side facing the engine E is referred to as die rear side of the intake manifold M. The side that is opposite to the side facing the engine E is referred to as the front side of the intake manifold M. The direction in which the plural intake ports 2 are arranged is referred to as the right-and-left direction of the intake manifold M.

Figure 2:
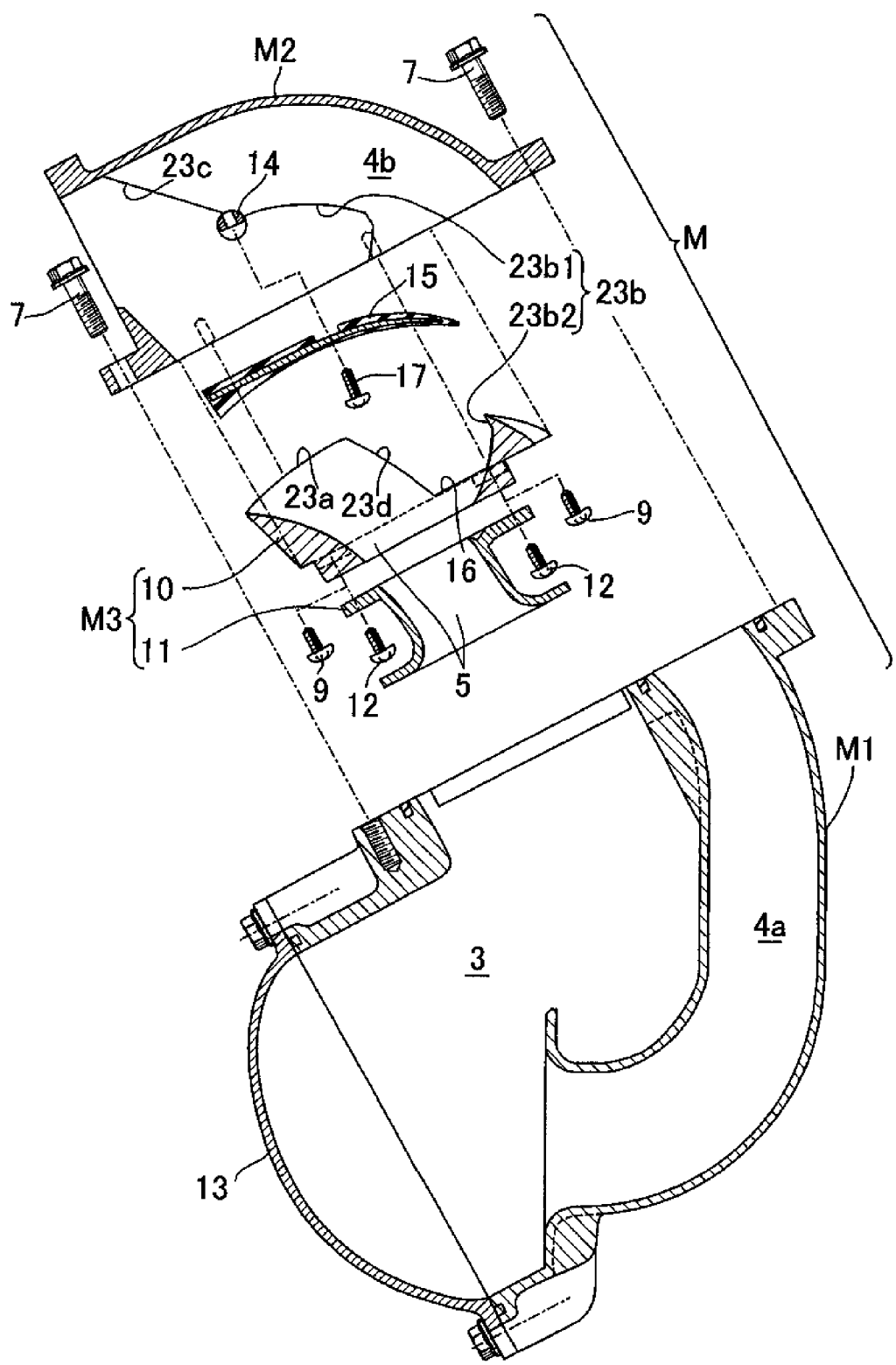
FIG. 2 is a view corresponding to FIG. 1 and showing the intake manifold that is in a disassembled state.
Figure 3:
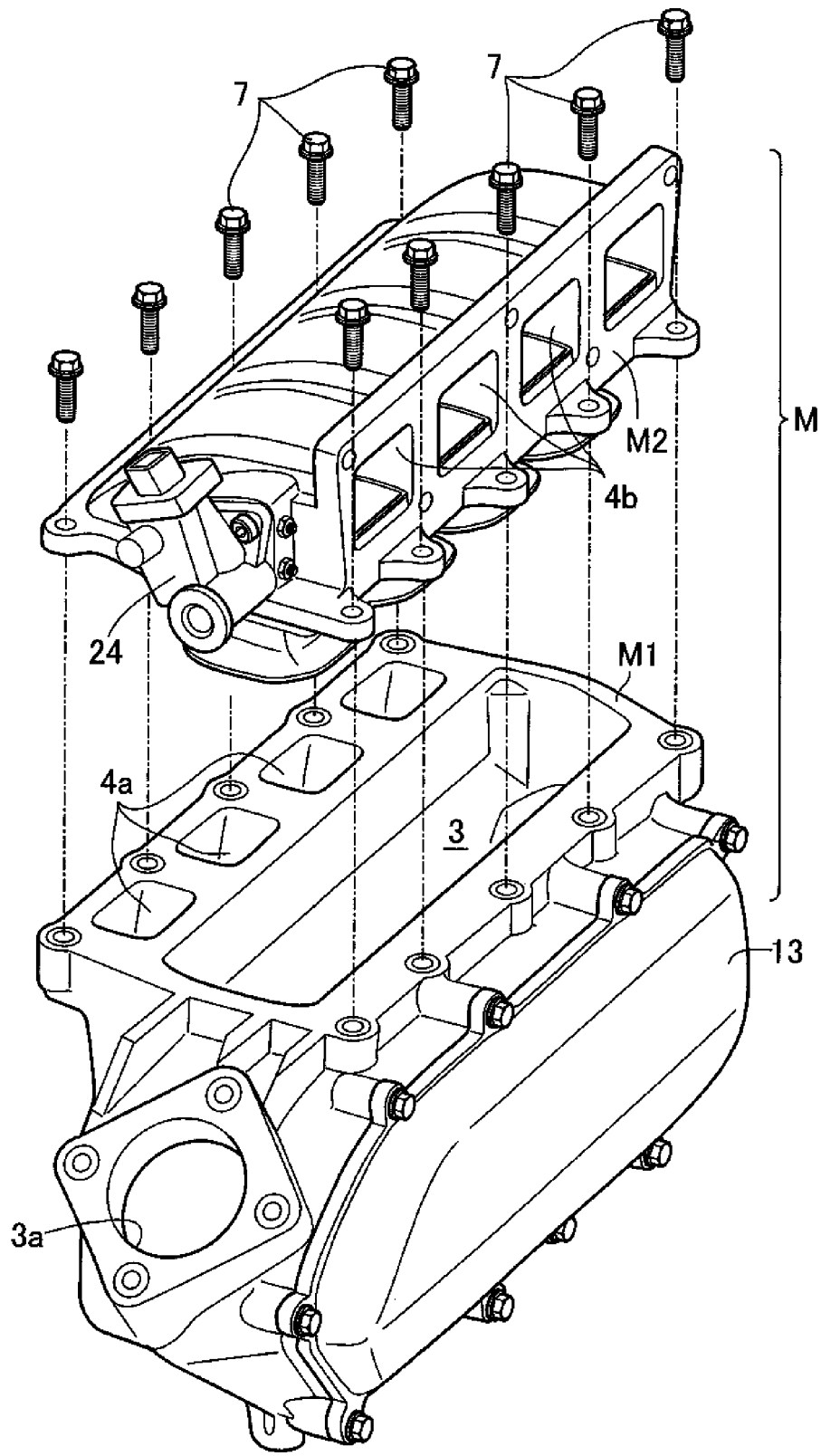
FIG. 3 is an exploded perspective view of a first block and a second block of the intake manifold.
Figure 4:
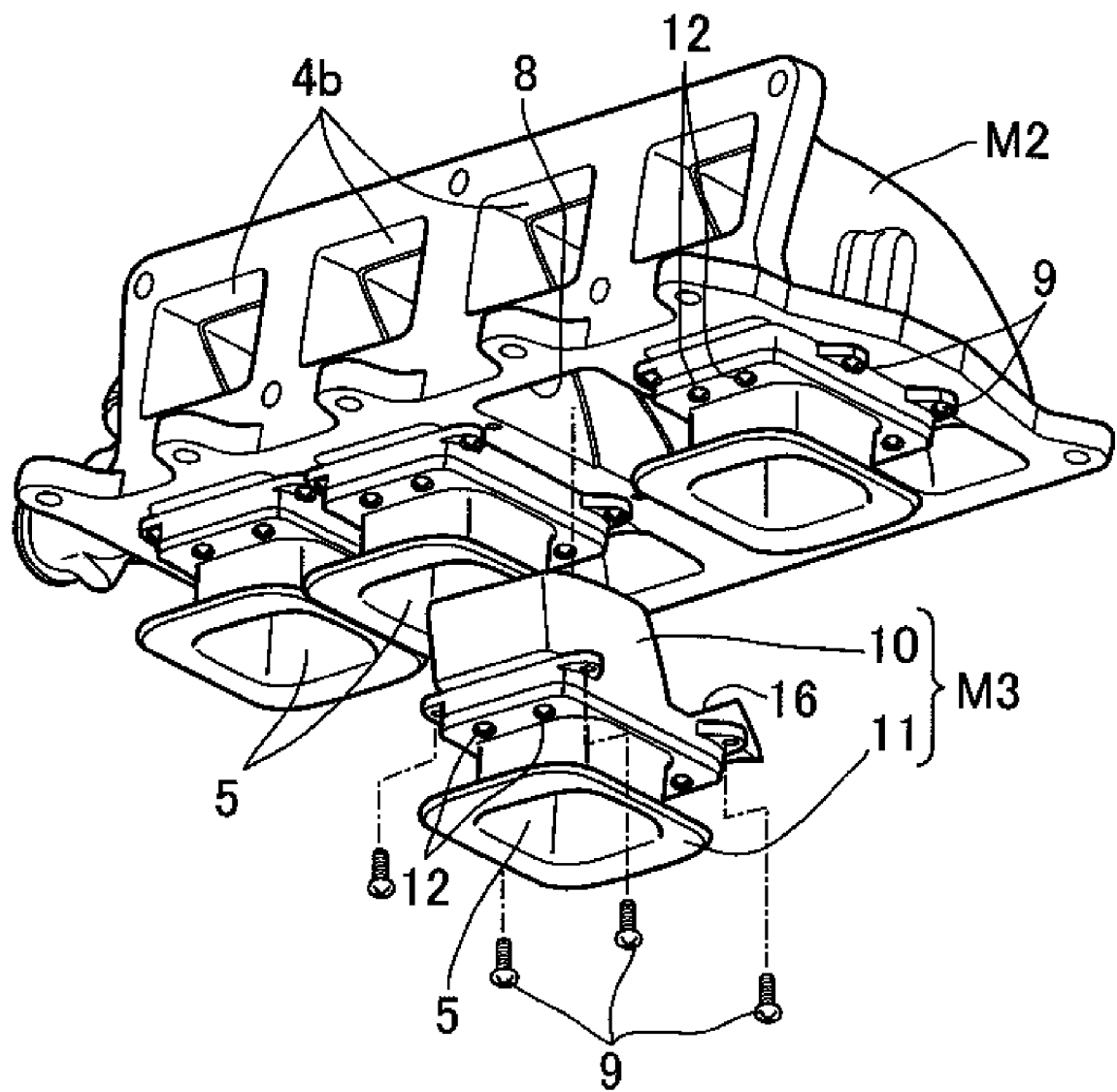
FIG. 4 is a perspective view of a third block of the intake manifold.

As shown in FIGS. 1 to 3, the intake manifold M includes at least two separate blocks—a first block M1 and a second block M2. The second block M2 is coupled to the upper face of the first block M1 with plural bolts 7. A single surge chamber 3 is formed on a side surface of the first block M1. An air entrance 3a (see FIG. 3) that is communicatively connected to an intake path of an unillustrated throttle body is formed on a side of the surge chamber 3 in the right-and-left direction thereof. Plural long intake passages 4 are formed across the first block M1 and the second block M2. The plural long intake passages 4 connect the respective ones of the plural intake ports 2 to the surge chamber 3. To be more specific, an upstream-side half portion 4a of each long intake passage 4 is formed in and integrally with the first block M1 while a downstream-side half portion 4b thereof is formed in and integrally with the second block M2. The upstream-side half portion 4a extends while curving upward to the front of the surge chamber 3. A funnel portion 4a', which is the upstream end portion of the upstream-side half portion 4a, is formed as an opening in a lower portion of the surge chamber 3. The downstream-side half portion 4b, which is disposed contiguously to the upstream-side half portion 4a, extends while curving upward to the rear and reaches the intake port 2.

Now, referring to FIGS. 4 to 7, plural fitting holes 8 are formed in the second block M2. Each of the fitting holes 8 is formed from the bottom face of the downstream-side half portion 4b of the long intake passage 4 down to the under face of the first block M1. Plural third blocks M3 are fitted into the fitting holes 8, respectively while the peripheral portion of each of the third blocks M3 is fastened to the under face of the second block M2 with plural bolts 9. A short intake passage 5, the length of which is shorter than that of the long intake passage 4, is formed in each third block M3. By way of the short intake passage 5, the downstream end portion of the long intake passage 4 is communicatively connected directly to the surge chamber 3. Each third block M3 includes a third-block main body 10 and a funnel member 11. The third-block main body 10 is fastened directly to the second block M2 while the funnel member 11 is coupled to the under face of the third-block main body 10 with bolts 12. The funnel member 11 forms the upstream end portion of the short intake passage 5 and has an opening, facing downwards, in the top portion of the surge chamber 3. The funnel member 11 is made of a synthetic resin in order to make the process of forming the funnel member 11 easier and to make the funnel member 11 lighter in weight.

Figure 15:
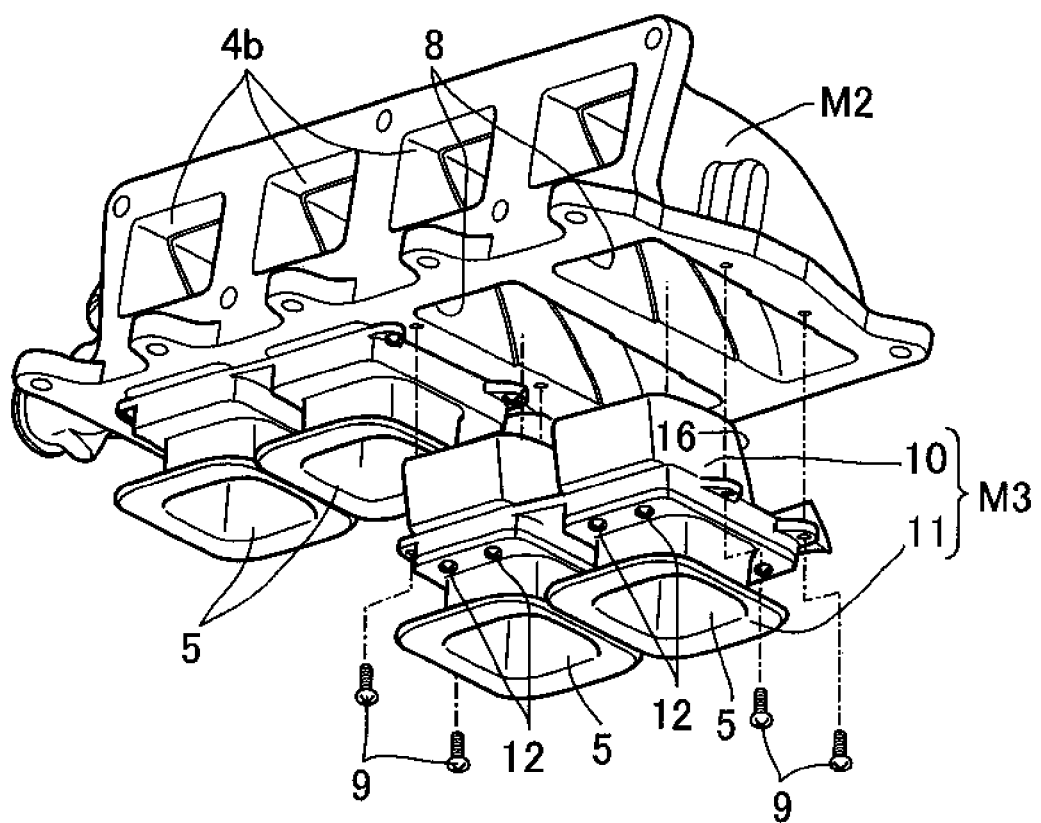
FIG. 15 is a perspective view of a modified third block of the intake manifold.
Figure 16:
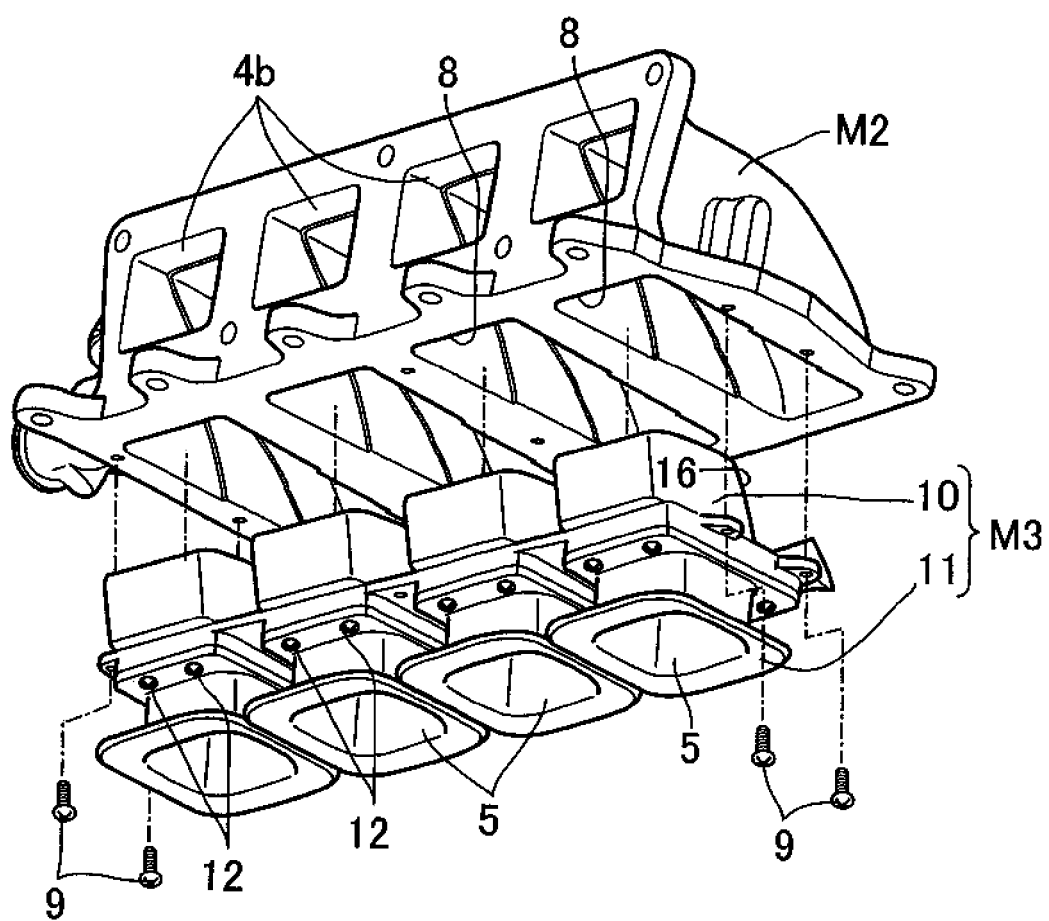
FIG. 16 is a perspective view of another modified third block of the intake manifold.

In the example shown in this illustrated embodiment, the plural third-block main bodies 10 are formed to fit to the respective short intake passages 5, that is, on one to one basis. Alternatively, the plural third-block main bodies 10 may be formed so that each of the units of integrally-formed third-block main bodies 10 can fit to a certain plural number of the short intake passages 5 (see FIG. 15), or so that one unit of integrally-formed third-block main bodies 10 can fit to all the short intake passages 5 (see FIG. 16). The alternative ways of forming the third-block main bodies 10 can reduce the number of attachment members, such as bolts 9. Besides, in these cases, the third-block main bodies 10 and the funnel members 11 can be formed integrally by molding with each other.

As FIGS. 1 to 3 show, for the sake of easy molding of the first block M1, the rear-side wall of the surge chamber 3 is formed as a lid plate 13, which is detachably bolted to the first block M1.

Figure 5:
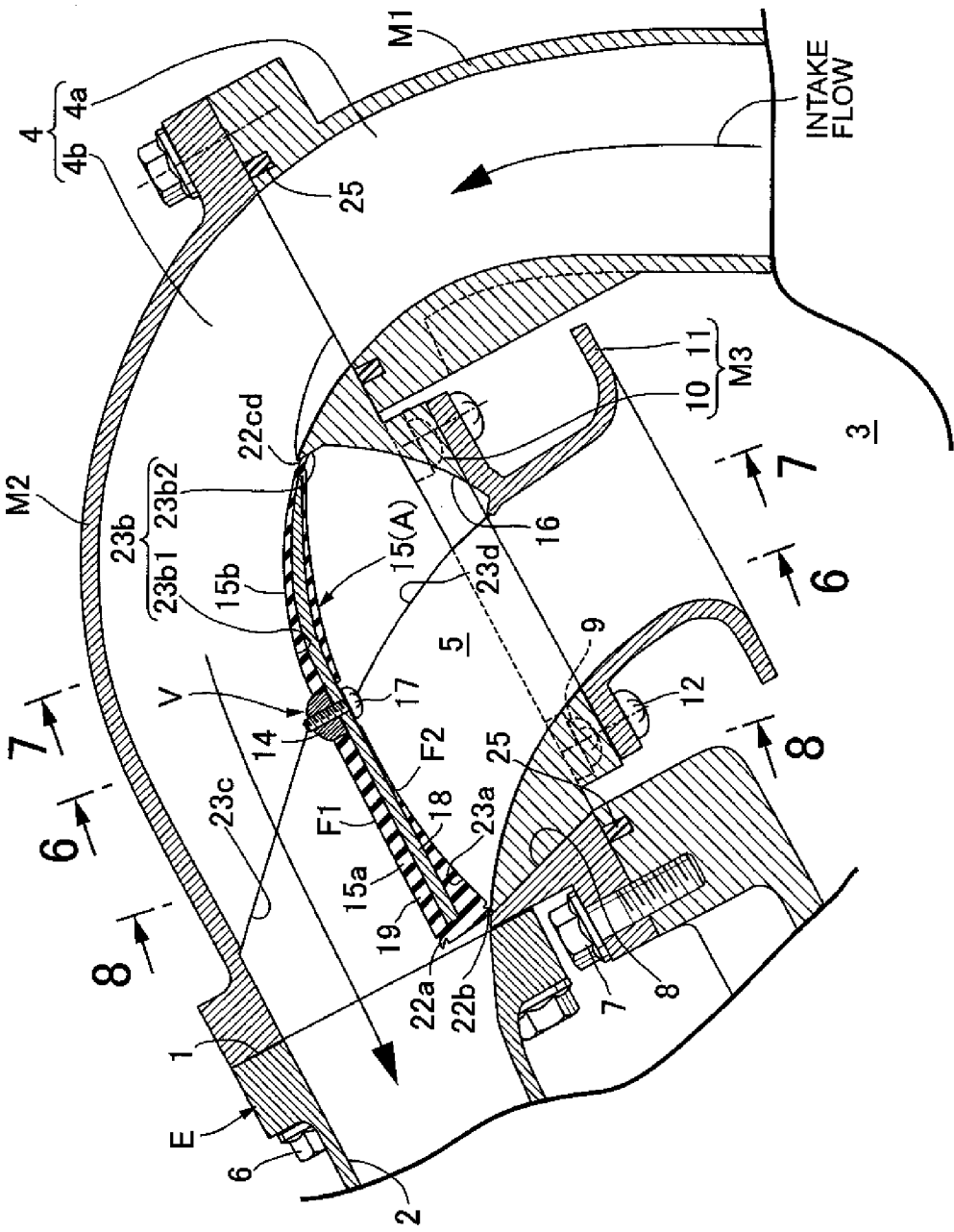
FIG. 5 is an enlarged view showing a changeover valve (in a state where a valve plate is at a first changeover position) of the FIG. 1 and the portion around the changeover valve.
Figure 6:
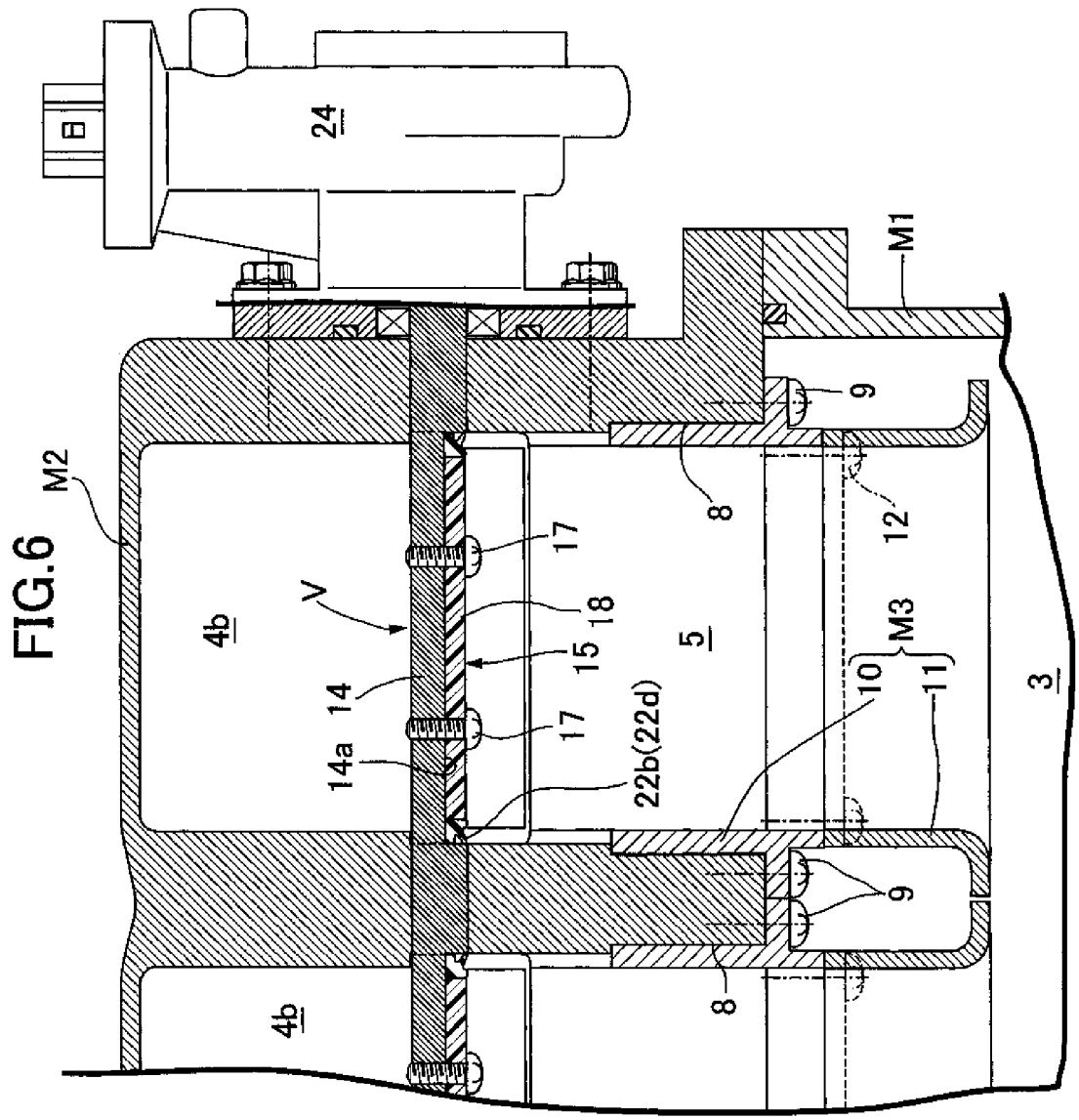
FIG. 6 is a sectional view taken along the line 6-6 of the FIG. 5.
Figure 7:
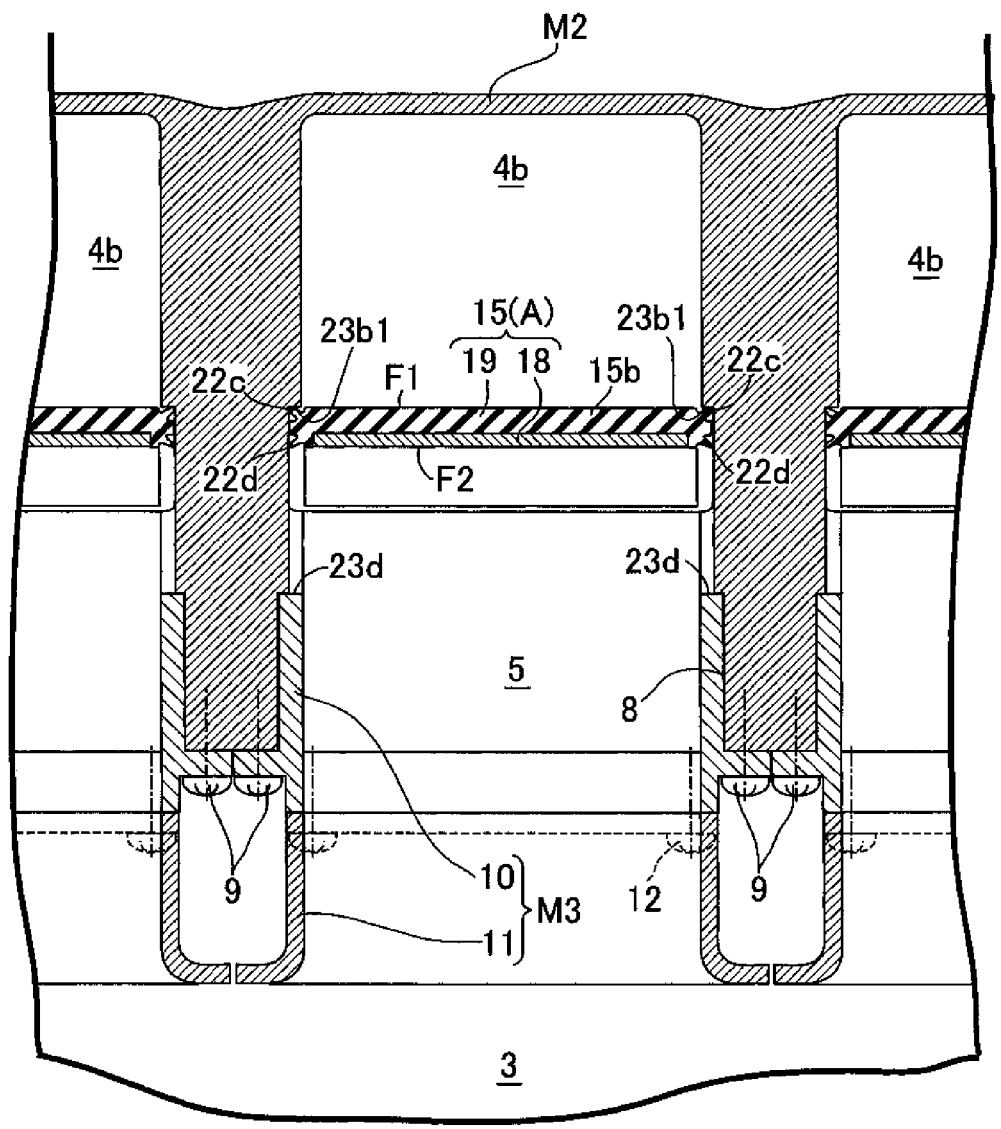
FIG. 7 is a sectional view taken along the line 7-7 of the FIG. 5.
Figure 8:
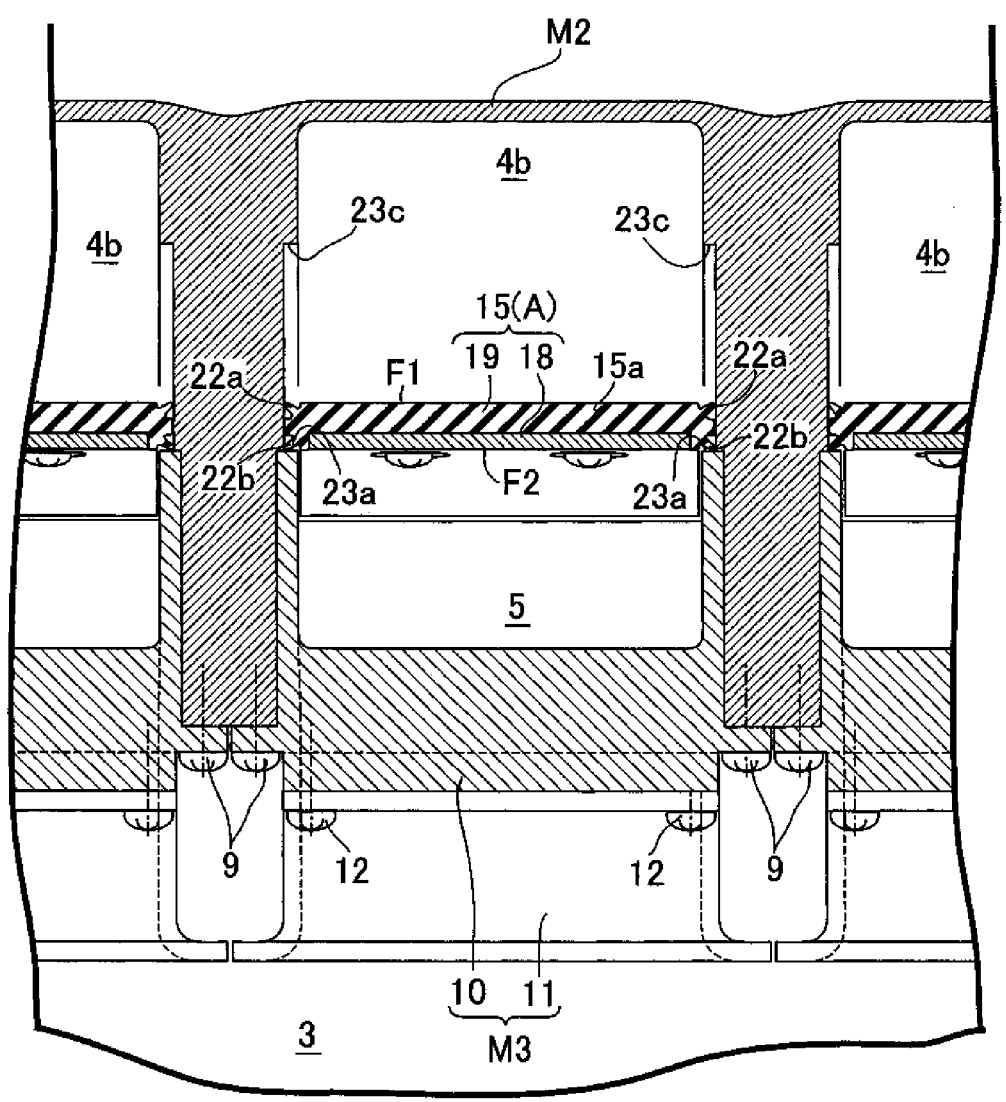
FIG. 8 is a sectional view taken along the line 8-8 of the FIG. 5.

As FIG. 5 shows, a changeover valve V is disposed in the intake manifold M. The changeover valve V selects, according to the operation conditions of the engine E, which one of the long intake passage 4 and the short intake passage 5 is connected to each of the intake ports 2 for the conduction of the air. The changeover valves V will be described below with reference to FIGS. 5, 6, and 12 to 14.

The changeover valve V includes a single, common valve shaft 14 and plural valve plates 15. The valve shaft 14 penetrates the plural long intake passages 4 in the right-and-left direction, and is rotatably supported by the second block M2 (see, especially, FIG. 6). The plural valve plates 15 are attached to the valve shaft 14 and correspond respectively to the sets of the long intake passages 4 and the short intake passages 5. The rotational movement of the valve shaft 14 makes each of the valve plates 15 move rotationally between a first changeover position A and a second changeover position B. Positioning the valve plates 15 at their respective first changeover positions A closes the short intake passages 5, and connects the long intake passages 4 respectively to the intake ports 2 (see FIGS. 1 and 5). Conversely, positioning the valve plates 15 at their respective second changeover positions B closes the long intake passages 4, and connects the short intake passages 5 respectively to the intake ports 2 (see FIG. 9). An actuator 24 is connected to the outer end portion of the valve shaft 14, and attached to one side surface, in the right-and-left direction, of the intake manifold M. The actuator 24 drives to rotate the valve shaft 14. The actuator 24 used for this purpose may be any types of actuators such as an electric one, an electromagnetic one, and one of the negative-pressure type. The separation walls each of which is located between every two adjacent long intake passages 4 function as bearing portions for the valve shaft 14. Bearing members, such as ball bearings and bushings, may be installed in the bearing portions.

Each of the butterfly-type valve plates 15 includes a first valve-plate half portion 15a and a second valve-plate half portion 15b, which extend in opposite directions to each other from the valve shaft 14. Positioning the valve plate 15 at the first changeover position A (see FIG. 5) makes a first plate face F1, which is located on the upper side of the valve plate 15, form a part of the under face of a downstream portion of the long intake passage 4. To this end, the first valve-plate half portion 15a is directed from the valve shaft 14 to the downstream side of the long intake passage 4 while the second valve-plate half portion 15b is directed from the valve shaft 14 to the upstream side of the long intake passage 4. Conversely, positioning the valve plate 15 at the second changeover position B (see FIG. 9) makes a second plate face F2, which is located on the lower side of the valve plate 15, form a part of the top face of a downstream portion of the short intake passage 5. To this end, the first valve-plate half portion 15a is directed from the valve shaft 14 to the downstream side of the short intake passage 5 while the second valve-plate half portion 15b is directed from the valve shaft 14 to the upstream side of the short intake passage 5.

A cutaway 16 is formed in each of the third blocks M3 to accept the second valve-plate half portion 15b of the valve plate 15 that moves rotationally to the second changeover position B.

Each of the valve plates 15 curves so as to fit the curved shape of the long intake passage 4 and that of the short intake passage 5. This curved shape of the valve plate 15 reduces the intake resistance to the minimum. To be more specific, the entire body of the valve plate 15 curves with its first plate face F1 being the convex side. Positioning the valve plate 15 at the first changeover position A makes the first plate face F1 substantially contiguous from the inner face of the long intake passage 4. Meanwhile, positioning the valve plate 15 at the second changeover position B makes the second plate face F2 be substantially contiguous from the inner face of the short intake passage 5. In addition, the valve plate 15 is formed so that the first plate face F1 and the second plate face F2 have different curvatures from each other. The thickness of the valve plate 15 is formed such that the curvatures of the first plate face F1 and second plate face F2 are differentiated from each other and each curvature is decreased gradually from the tip end portion of the second-plate half portion 15b which is the farthest portion from the valve shaft 14, toward the tip end portion of the first valve-plate half portion 15a which is the farthest portion from the valve shaft 14.

In addition, each of the valve plates 15 is comprised of a core plate 18 and an outer shell 19. The core plate 18, which is made either of a metal or of a hard synthetic resin, is fixed, with plural screws 17, to a flat face 14a located on a side of the valve shaft 14. The outer shell 19, which is made of an elastic material, such as rubber, is bonded by molding, to the core plate 18, and coats both the top and the bottom of the core plate 18. In the outer shell 19, a recessed portion 20 to accept the valve shaft 14 is formed on the first plate face F1 side. In addition, recessed portions 21 to accept the heads of the screws 17 are formed on the second plate face F2 side of the outer shell 19. These recessed portions 20 and 21 reduce the intake resistance caused by the valve shaft 14, the machine screws 17, and the like down to the minimum.

As seen in plan view, each of the first valve-plate half portion 15a and the second valve-plate half portion 15b of the valve plate 15 has a substantially square shape, which fits both of the sectional shapes of the long intake passage 4 and the short intake passage 5. In addition, a first seal lip 22a of angular U-shape is formed in the outer shell 19 so as to form a peripheral edge portion of the first valve-plate half portion 15a on the first plate face F1 side. A second seal lip 22b of angular U-shape is also formed in the outer shell 19 so as to form the peripheral edge portion of the first valve-plate half portion 15a on the second plate face F2 side. A third seal lip 22c of angular U-shape is formed in the outer shell 19 so as to form the peripheral edge portion of the second valve-plate half portion 15b of the first plate face F1 side, and a fourth seal lip 22d of angular U-shape is formed in the outer shell 19 so as to form the peripheral edge portion of the second valve-plate half portion 15b of the second plate face F2 side Since the first valve-plate half portion 1 ia becomes gradually thicker towards its tip end portion, the first and the second seal lips 22a and 22b are separated from each other by the amount of the thickness. In contrast, the second valve-plate half portion 15b becomes gradually narrower toward its tip end portion. Accordingly, the third and the fourth seal lips 22c and 22d are united together at the tip end portion of the second valve-plate half portion 15b, and form a common, single lateral lip 22cd extending in the lateral direction parallel to the valve shaft 14. To put it in other words, the third and the fourth seal lips 22c and 22d share a common lateral-direction lip 22cd on the tip end portion side of the second valve-plate half portion 15b. Alternatively, the third and the fourth seal lips 22c and 22d may be formed so that the entire portions of the third and the fourth seal lips 22c and 22d can be independent of each other, as in the case of the first and the second seal lips 22a and 22b.

In addition, the second and the fourth seal lips 22b and 22d are joined together so as to form a contiguous body on a side of the valve plate 15. The second and the fourth seal lips 22b and 22d thus formed are brought into contact with the corresponding inner surfaces of the long intake passage 4 and of the short intake passage 5 when the valve plate 15 is positioned at the first and the second changeover positions A and B.

In the meanwhile, a first valve seat 23a, a second valve seat 23b, a third valve seat 23c, and a fourth valve seat 23d are formed in the intake manifold M as shown in FIGS. 2, 5, and 7 to 11. When the valve plate 15 occupies the first changeover position A, the first seal lip 22a of the first valve-plate half portion 15a is seated on the first valve seat 23a, which has an angular U-shape as seen in a plan view. Likewise, when the valve plate 15 occupies the first changeover position A, the third seal lip 22c of the second valve-plate half portion 15b is seated on the second valve seat 23b, which also has an angular U-shape as seen in a plan view. In contrast, when the valve plate 15 occupies the second changeover position B, the second seal lip 22b of the first valve-plate half portion 15a is seated on the third valve seat 23c, which also has an angular U-shape as seen in a plan view. Likewise, when the valve plate 15 occupies the second changeover position B, the fourth seal lip 22d of the second valve-plate half portion 15b is seated on the fourth valve seat 23d, which also has an angular U-shape as seen in a plan view.

To be more specific, as FIGS. 2, 5, 7, and 8 show, the first valve seat 23a, on which the first seal lip 22a of the first valve-plate half portion 15a is seated, is formed in the third block M3. Meanwhile, the second valve seat 23b, on which the third seal lip 22c of the second valve-plate half portion 15b is seated, is formed in both the second block M2 and the third block M3. Here, the angular U-shaped, second valve seat 23b includes a pair of longitudinal-direction seats 23b1 formed in the second block M2 and a lateral-direction seat 23b2 formed in the third block M3. The longitudinal-direction seats 23b1 are the seats on which the two side portions of the third seal lip 22c are seated respectively. The lateral-direction seat 23b2, on the other hand, is the seat on which the lateral-direction lip 22cd of the third seal lip 22c is seated. All of these longitudinal-direction seats 23b1 and the lateral-direction seat 23b2 are formed contiguously to one another so that the third seal lip 22c can be in contact with these seats 23b1 and 23b2 without any break.

In addition, as FIGS. 2, and 9 to 11 show, the third valve seat 23c, on which the second seal lip 22b of the first valve-plate half portion 15a is seated, is formed in the second block M2 while the fourth valve seat 23d, on which the fourth seal lip 22d of the second valve-plate half portion 15b is seated, is formed in the third block M3.

The first to the fourth valve seats 23a to 23d are formed as shoulders each of which protrudes inwards of the corresponding one of the intake passages 4 and 5. Alternatively, a part of or the whole part of the first to the fourth valve seats 23a to 23d, which are formed of above-described shoulders, may be formed to be tapered so that each of the intake passage 4 and 5 can have its cross-section narrowed continuously in the direction of the rotational movement of the valve plate 15. The tapered form can eliminate the possibility of forming any discontinuous changes in sections of the respective ones of the intake passages 4 and 5. The valve plate 15, irrespective of whether the valve plate 15 is at the first changeover position A or at the second changeover position B, can be brought into close contact with the corresponding one of the inner surfaces of the intake passages 4 and 5. Such a configuration is useful when the flow-passage resistance has to be reduced.

The above-described way of forming the first to the fourth valve seats 23a to 23d separately in the first to the third blocks M1 to M3 can contribute to easier formation of these valve seats 23a to 23d.

As FIG. 5 clearly shows, a seal member 25 that surrounds both the long intake passage 4 and the short intake passage 5 is installed between the joint faces of the first and the second blocks M1 and M2. An O-ring or the like can be employed as the seal member 25.

Some of the advantageous effects of this embodiment will be described below.

When the engine E is operated at low speed, the actuator 24 moves rotationally the valve shaft 14 of the changeover valve V in the counter-clockwise direction in FIG. 5. The valve plates 15 are thus moved rotationally to their respective first changeover positions A. In this state, each of the valve plates 15 has its first valve-plate half portion 15a directed from the valve shaft 14 to the downstream side of the long intake passage 4, and has its second valve-plate half portion 15b directed from the valve shaft 14 to the upstream side of the long intake passage 4. The first plate face F1 of the first and the second valve-plate half portions 15a and 15b can thus form a part of the under face of a downstream portion of the long intake passage 4. The short intake passage 5 is closed while the long intake passage 4 is connected to the corresponding one of the intake ports 2 for the conduction of the air. Accordingly, in the intake stroke of each cylinder of the engine E, the air, the flow rate of which has been controlled by the unillustrated throttle body, flows into the surge chamber 3 through the air entrance 3a, then passes through the relatively longer tubular passage formed by both the long intake passage 4 and the intake port 2, and is thereafter supplied to the engine E. This makes the inside of the intake manifold M suitable for the low-speed running of the engine E. To put it differently, the inside of the intake manifold M is switched into the low-speed intake mode. In this mode, higher charging efficiency can be achieved by taking advantage of the intake inertia effect, and higher output performance of the engine E can thus be achieved for the low-speed range.

In this event, the intake negative pressure of the engine E acts on the first plate face F1 of the valve plate 15—the plate face that faces the long intake passage 4. Remember that the valve plate 15 is comprised of the first and the second valve-plate half portions 15a and 15b, which extend in opposite directions to each other from the common valve shaft 14. The direction of the moment around the valve shaft 14 exerted on the first valve-plate half portion 15a by the intake negative pressure and the direction of the moment around the valve shaft 14 exerted on the second valve-plate half portion 15b by the intake negative pressure are opposite to each other, so that the two moments cancel out each other. Zero or a significantly reduced moment that acts on the valve shaft 14 is the outcome of the canceling out. As a consequence, only a small power is needed to keep the valve plate 15 at the first changeover position A, and only a small drive torque is needed to move rotationally the valve plate 15 from the first changeover position A to the second changeover position B.

In addition, when the valve plate 15 is at the first changeover position A, the first plate face F1, which curves in a convex shape, comes to be contiguous from the under face of the long intake passage 4, which face also curves in a convex shape. Besides, most of the valve shaft 14 sinks below the first plate face F1. Accordingly, the changeover valve V is prevented from causing the increase in the flow-passage resistance of the long intake passage 4, and thus the intake inertia effect can be obtained effectively.

Furthermore, when the valve plate 15 is at the first changeover position A, the second seal lip 22b of the first valve-plate half portion 15a is seated on the first valve seat 23a formed in the third block M3, and the third seal lip 22c of the second valve-plate half portion 15b is seated on the second valve seat 23b formed both in the second block M2 and in the third block M3. Accordingly, the air is reliably prevented from leaking from the short intake passage 5 to the long intake passage 4. Such prevention is also an extremely useful way of effectively obtaining the intake inertia effect.

Figure 9:
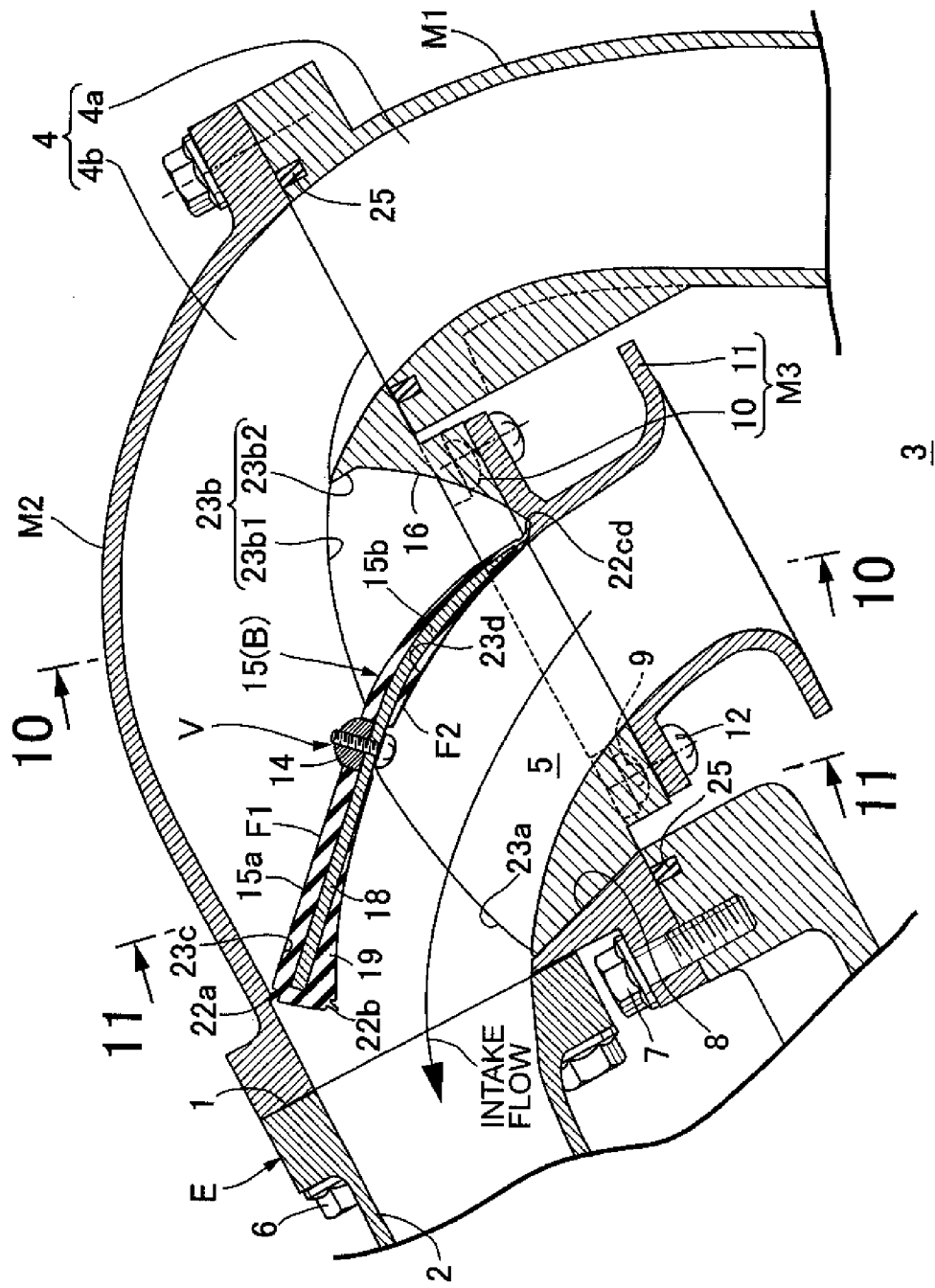
FIG. 9 is a view corresponding to FIG. 5 and showing a state where the valve plate is at a second changeover position.
Figure 10:
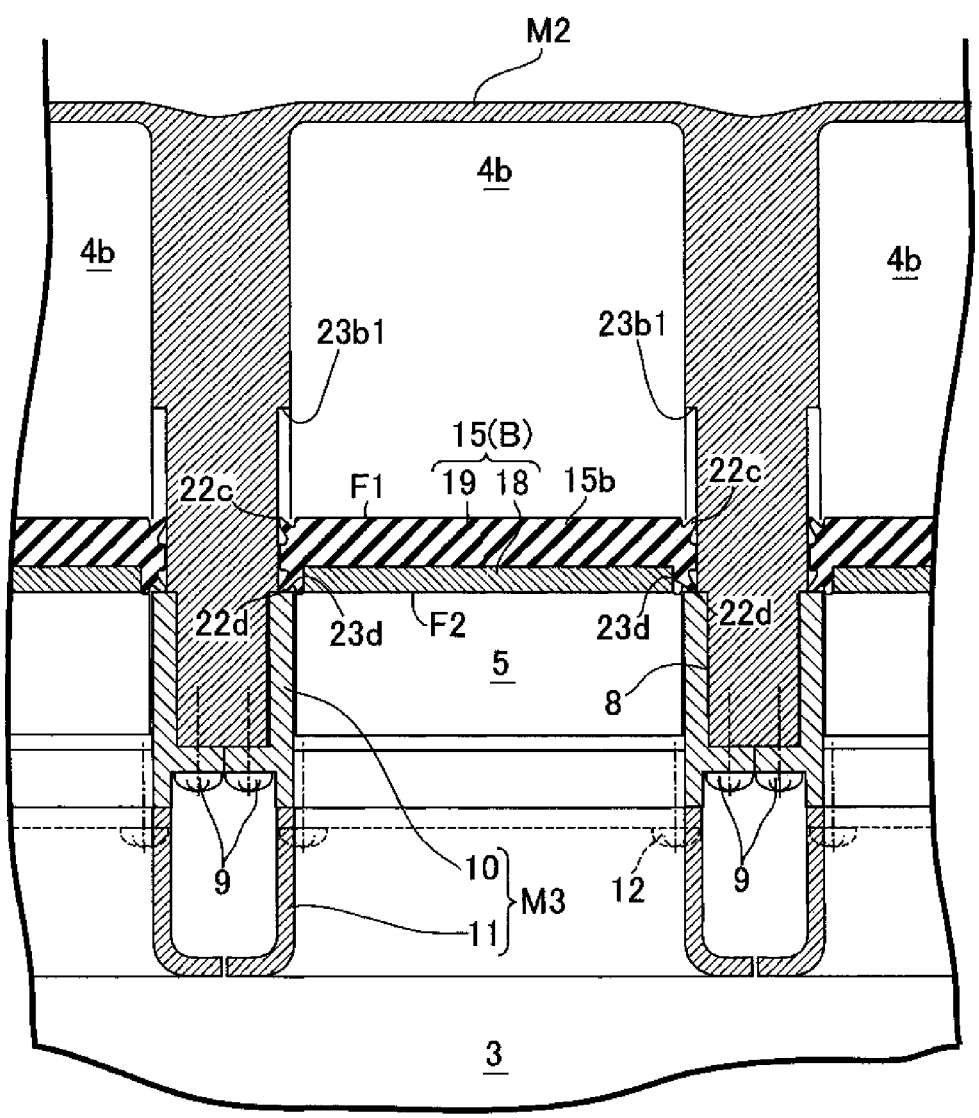
FIG. 10 is a sectional view taken along the line 10-10 of the FIG. 9.
Figure 11:
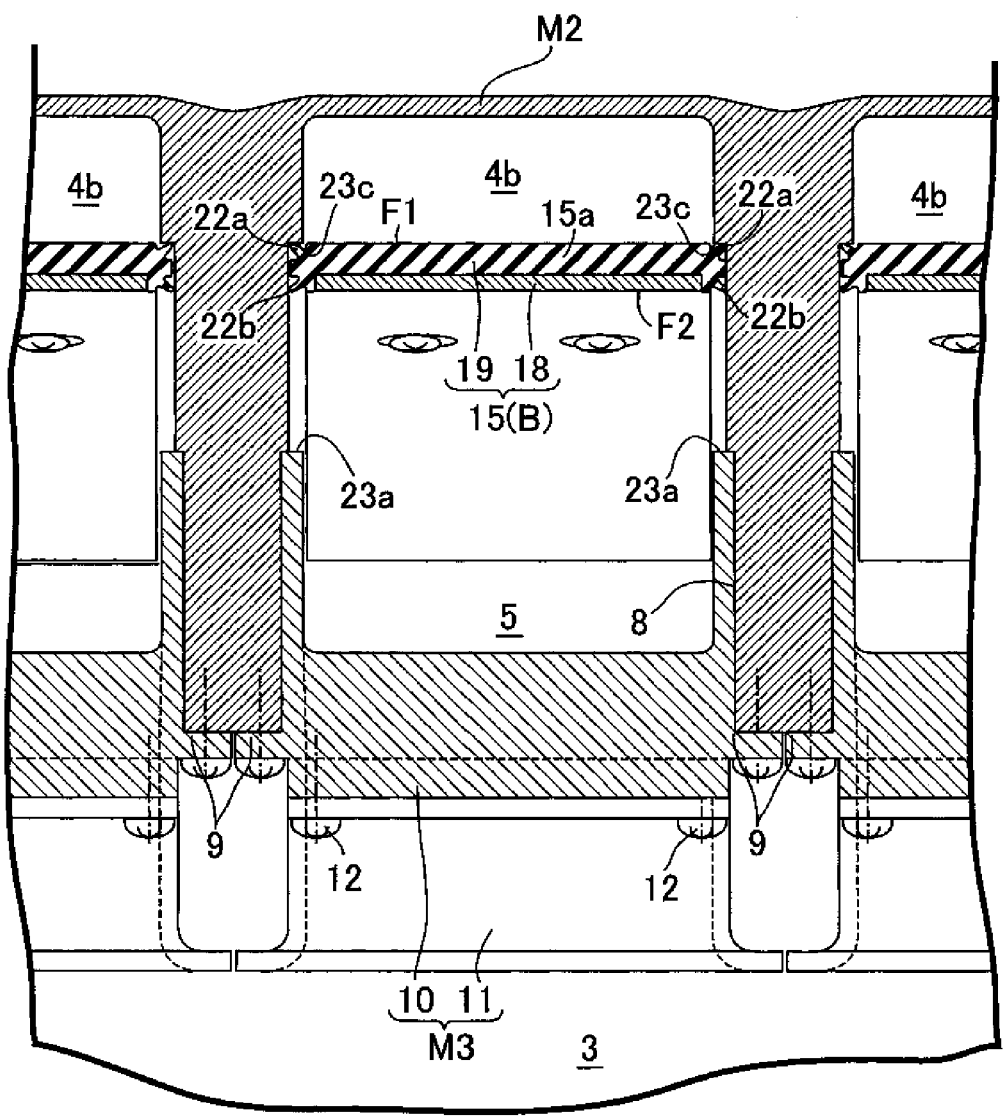
FIG. 11 is a sectional view taken along the line 11-11 of the FIG. 9.
Figure 12:
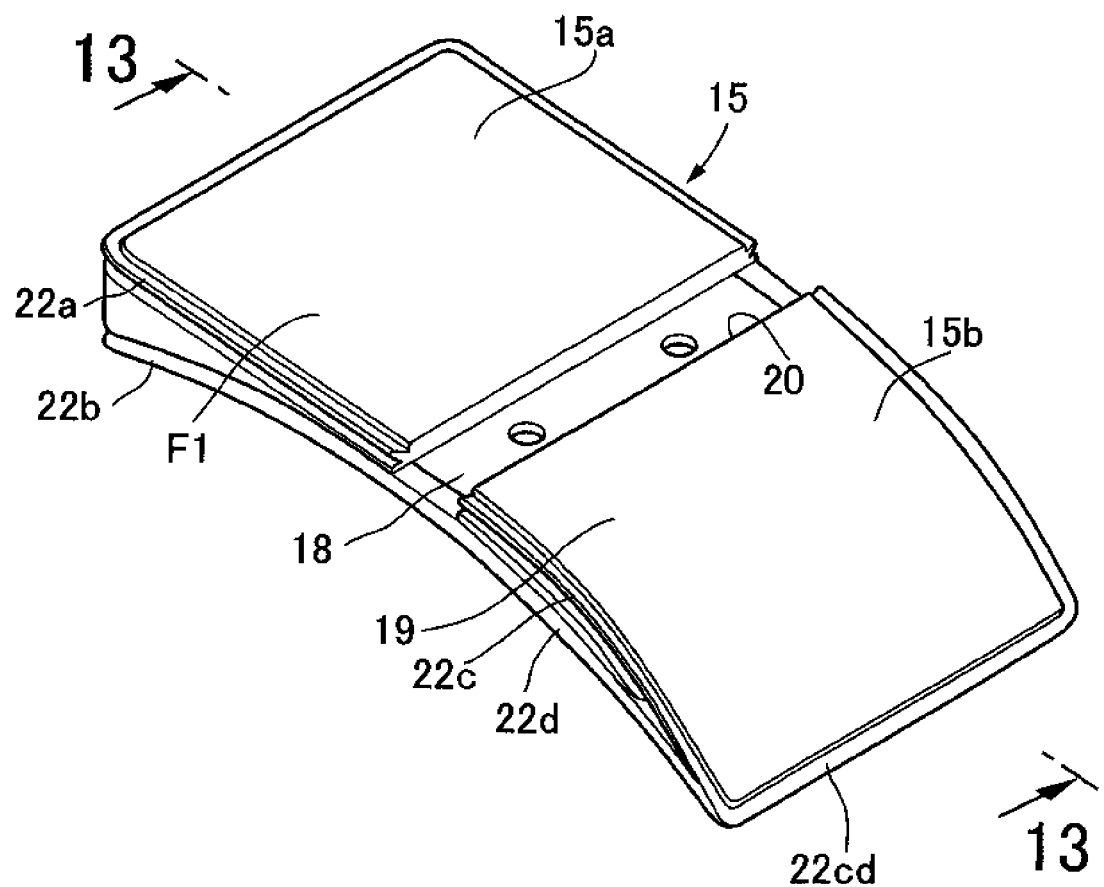
FIG. 12 is a perspective view of the valve plate.
Figure 13:
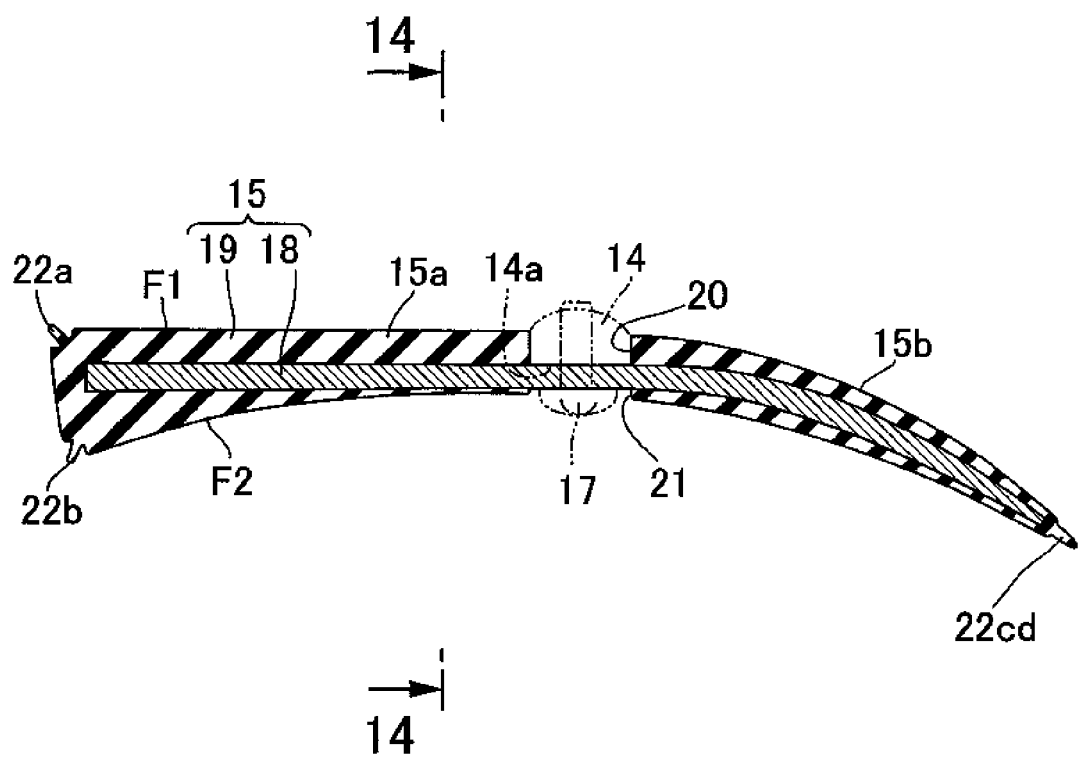
FIG. 13 is a sectional view taken along the line 13-13 of FIG. 12.
Figure 14:
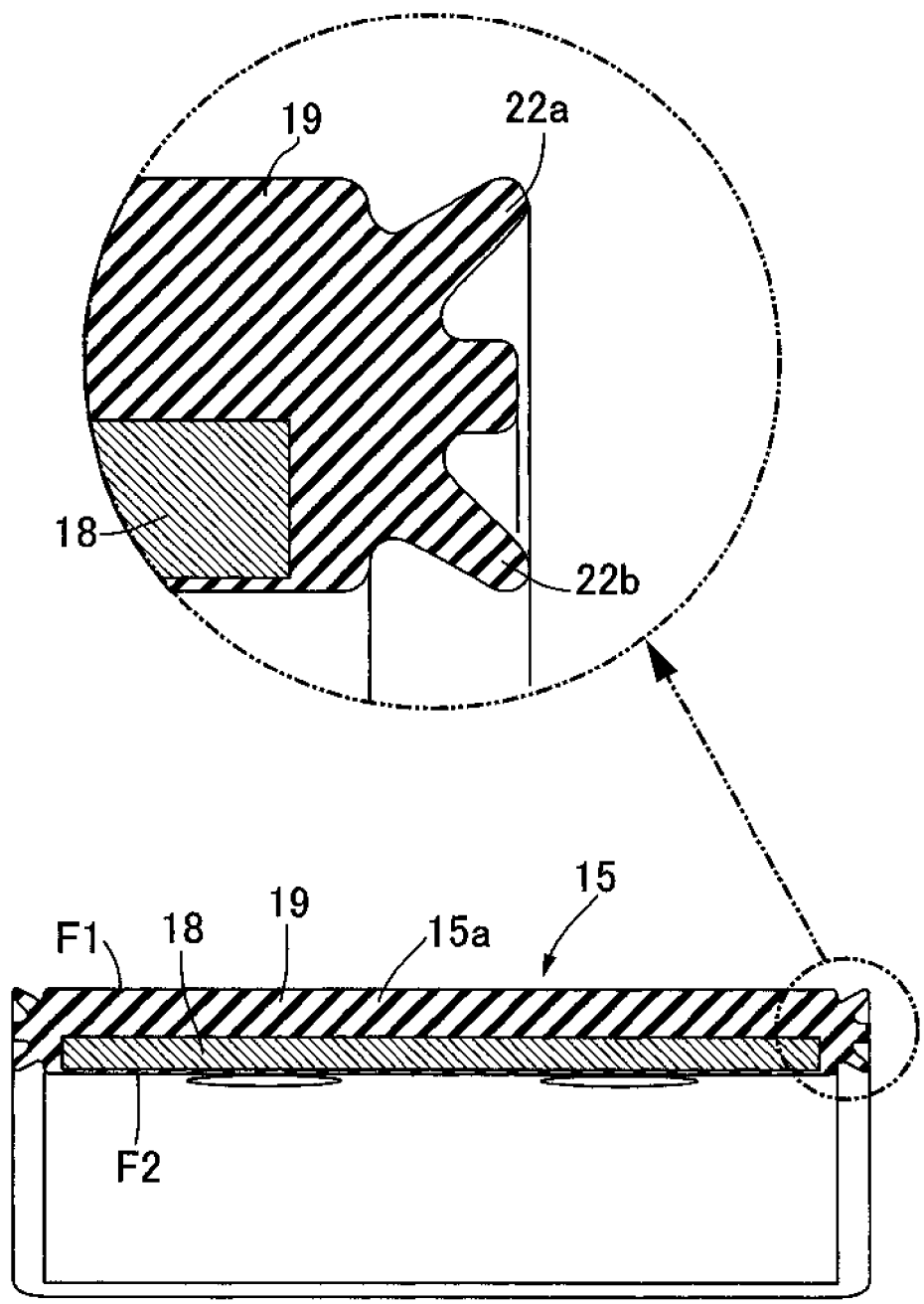
FIG. 14 is a sectional view taken along the line 14-14 of FIG. 13.

When the engine E is operated at high speed, the actuator 24 moves rotationally the valve shaft 14 of the changeover valve V in the clockwise direction in FIG. 9. The valve plates 15 thus change their respective positions to the second changeover positions B. In this state, each of the valve plates 15 has its first valve-plate half portion 15a directed from the valve shaft 14 to the downstream side of the short intake passage 5, and has its second valve-plate half portion 15b directed from the valve shaft 14 to the upstream side of the short intake passage 5. The second plate face F2 of the first and the second valve-plate half portions 15a and 15b can thus form a part of the top face of the short intake passage 5. The long intake passage 4 is closed while the short intake passage 5 is connected to the corresponding one of the intake ports 2 for the conduction of the air. Accordingly, in the intake stroke of each cylinder of the engine E, the air, the flow rate of which has been controlled by the unillustrated throttle body, flows into the surge chamber 3 through the air entrance 3a, then passes through the relatively shorter tubular passage formed by both the short intake passage 5 and the intake port 2, and is thereafter supplied to the engine E. This makes the inside of the intake manifold M suitable for the high-speed running of the engine E. To put it differently, the inside of the intake manifold M is switched into the high-speed intake mode. In this mode, higher charging efficiency can be achieved by reducing the intake resistance and by taking advantage of the pulsation effect of the intake air, and higher output performance of the engine E can thus be achieved for the high-speed range.

In this event, the intake negative pressure of the engine E acts on the second plate face F2 of the first and the second valve-plate half portions 15a and 15b of the valve plate 15—the plate face that faces the short intake passage 5. Also in this case, the direction of the moment around the valve shaft 14 exerted on the first valve-plate half portion 15a by the intake negative pressure and the direction of the moment around the valve shaft 14 exerted on the second valve-plate half portion 15b by the intake negative pressure are opposite to each other, so that the two moments cancel out each other. Zero or a significantly reduced moment that acts on the valve shaft 14 is the outcome of the canceling out. As a consequence, only a small power is needed to keep the valve plate 15 at the second changeover position B, and only a small drive torque is needed to move rotationally the valve plate 15 from the second changeover position B to the first changeover position A. For this reason, the output of the actuator 24 to drive and rotate the valve shaft 14 can be made smaller, and the actuator 24 can be made smaller in size.

In addition, when the valve plate 15 is at the second changeover position B, the second plate face F2, which curves in a concave shape, comes to be contiguous from the top face of the short intake passage 5, which face also curves in a concave shape. Besides, the heads of the screws 17 to fix the valve plate 15 to the valve shaft 14 sink below the second plate face F2. Accordingly, the changeover valve V is prevented from causing the increase in the flow-passage resistance of the short intake passage 5.

Furthermore, when the valve plate 15 is at the second changeover position B, the second seal lip 22b of the first valve-plate half portion 15a is seated on the third valve seat 23c formed in the second block M2, and the fourth seal lip 22d of the second valve-plate half portion 15b is seated on the fourth valve seat 23d formed in the third block M3. Accordingly, the air is reliably prevented from leaking from the long intake passage 4 to the short intake passage 5. Such prevention is also an extremely useful way of effectively obtaining the pulsation effect.

In addition, the second and the fourth seal lips 22b and 22d of the valve plate 15 are joined together so as to form a contiguous body on a side of the valve shaft 14. The second and the fourth seal lips 22b and 22d thus formed are brought into contact with the corresponding inner surfaces of the long intake passage 4 and of the short intake passage 5 when the valve plate 15 is positioned at the first and the second changeover positions A and B. Accordingly, the air can be prevented from leaking between the long intake passage 4 and of the short intake passage 5 through the portion around the valve shaft 14.

Moreover, the thick formed first valve-plate half portion 15a separates the first seal lip 22a of the first plate face F1 from the second seal lip 22b of the second plate face F2.

Accordingly, the angle needed for changing the positions of the valve plate 15 between the first and the second changeover positions A and B can be made smaller down to the minimum level by the amount corresponding to the in-between separation distance. As a consequence, quicker response in the changing over can be expected.

Incidentally, the intake manifold M is comprised of at least two separate bodies that are to be joined together, that is, the first block M1 and the second block M2. The surge chamber 3 and the upstream-side half portions 4a of the long intake passages 4 are formed in and integrally with the first block M1. Meanwhile, the downstream-side half portions 4b of the long intake passages 4 are formed in and integrally with the second block M2. The valve shaft 14 of the changeover valve V is attached to the second block M2. In addition, the third blocks M3, in each of which the short intake passage 5 is formed, are disposed contiguously to the second block M2. The upstream end portion of the short intake passage 5 is an opening facing the surge chamber 3 and the downstream end portion thereof is an opening facing the downstream-side half portion 4b of the long intake passage 4. Moreover, while the valve plates 15 that are at their respective first changeover positions A close the corresponding ones of the downstream end portions of the short intake passages 5, the valve plates 15 that are at their respective second changeover positions B close the corresponding ones of the downstream-side half portions 4b of the long intake passages 4. Accordingly, the first, the second, and the third blocks M1, M2, and M3 can be formed using materials that suit the respective functions thereof. For example, the first block M1, which includes the surge chamber 3 of a large capacity and the relatively-long upstream-side half portions 4a of the long intake passages 4, has to be, among other things, light in weight. For this reason, the first block M1 is made of synthetic resin. The second block M2, which positioned close to the engine E, has to be heat-resistant. In addition, the second block M2, which supports the valve shaft 14 and includes the second and the third valve seats 23b and 23c, has to be abrasion-resistant. For these reasons, the second block M2 is made of a light alloy metal and is formed by casting. Since the third block M3, which includes the first and the fourth valve seats 23a and 23d, has to be abrasion-resistant, the third block M3 is also made of a light alloy and is formed by casting.

Figure 17:
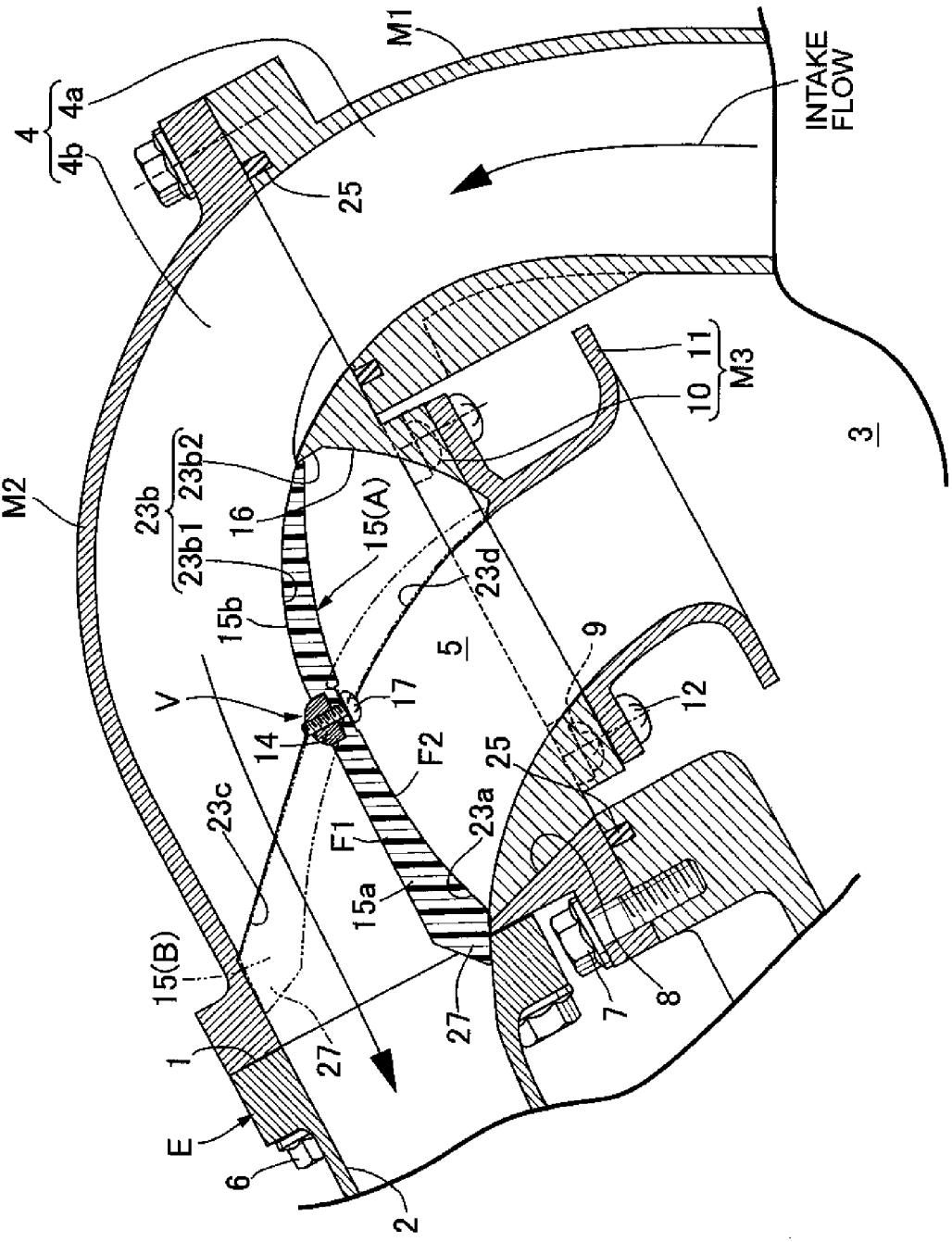
FIG. 17 is a view corresponding to FIG. 5 and showing a second embodiment of the present embodiment.

A second embodiment of the present invention will be described next with reference to FIG. 17.

In this second embodiment, either the entire bodies of the valve plates 15 or only the outer shells of the valve plates 15 are made of a synthetic resin that can be used for the purpose of sealing. Accordingly, none of the first to the fourth seal lips, such as ones used in the first embodiment, is provided. Note that, in the second embodiment, the role of sealing portions is played by the peripheral edge portions of the first and the second plate faces F1 and F2 of the valve plates 15. To this end, the peripheral edge portions are seated on the first to the fourth valve seats 23a to 23d. In the tip end portion of each of the first valve-plate half portions 15a, the peripheral edge portions of the first plate face F1 and the peripheral edge portions of the second plate face F2 are separated from each other. A tapered flow-straightening protrusion 27 is formed in and integrally with the tip end portion of the first valve-plate half portion 15a. When each of the valve plates 15 is at its first and its second changeover positions A and B, the flow-straightening protrusion 27 is in contact with or comes close to the inner face of the corresponding one of the intake passages 4 and 5. The configuration of other parts is the same as that in the first embodiment. Accordingly, in FIG. 17, the parts that have their respective counterparts in each of the valve plates 15 of the first embodiment are given identical reference numerals to those given in the first embodiment. Descriptions for these parts will not be repeated.

In this second embodiment, the peripheral edge portions of the first plate face F1 and the peripheral edge portions of the second plate face F2 of the valve plate 15 are separated from each other in the tip end portion of each of the first valve-plate half portions 15a and the second valve-plate half portions 15b. The tapered flow-straightening protrusion 27 provided in the tip end portion helps to prevent the thickly-made tip end portion of the valve plate 15 from causing turbulence of the intake air flow irrespective of whether the valve plate is in its first changeover position A or in its second changeover position B. Accordingly, higher intake efficiency of the engine E can be achieved. It should be noted here that the flow-straightening protrusion 27 can be provided even in the case, such as the first embodiment, where each of the valve plates 15 is provided with seal lips.

Figure 18:
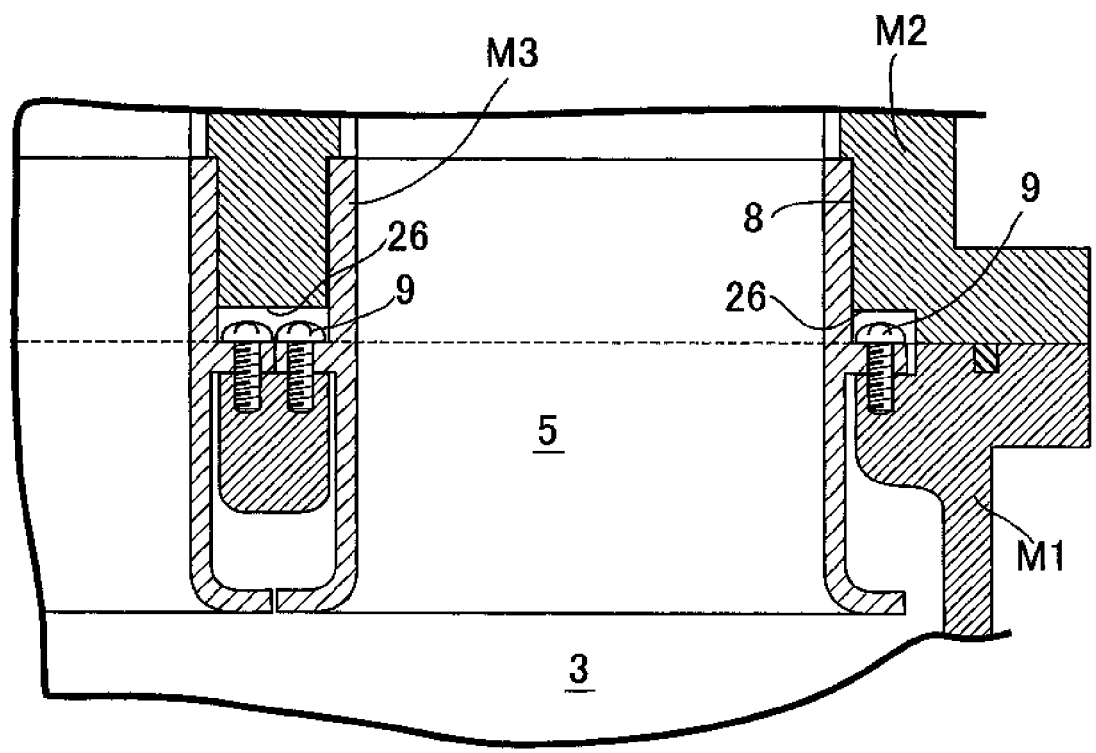
FIG. 18 is a view corresponding to FIG. 7 and showing a third embodiment of the present invention.

A third embodiment of the present invention will be described next with reference to FIG. 18.

In this third embodiment, a single, integrally-formed third block M3 is employed. The third block M3 is bolted to the first block M1 side with bolts 9. Counter-bore portions 26 are formed in the under face of the second block M2 to accept the heads of the bolts 9 respectively. Except for these points, the configuration of the third embodiment is substantially the same as that of the first embodiment. Accordingly, in FIG. 18, the parts that correspond to those of the first embodiment are given identical reference numerals. Descriptions of these parts will not be repeated.

According to the third embodiment, the counter-bore portions 26 formed in the under face of the second block M2 prevent the falling off of the bolts 9, even when the bolts 9 come loose.

Figure 19:
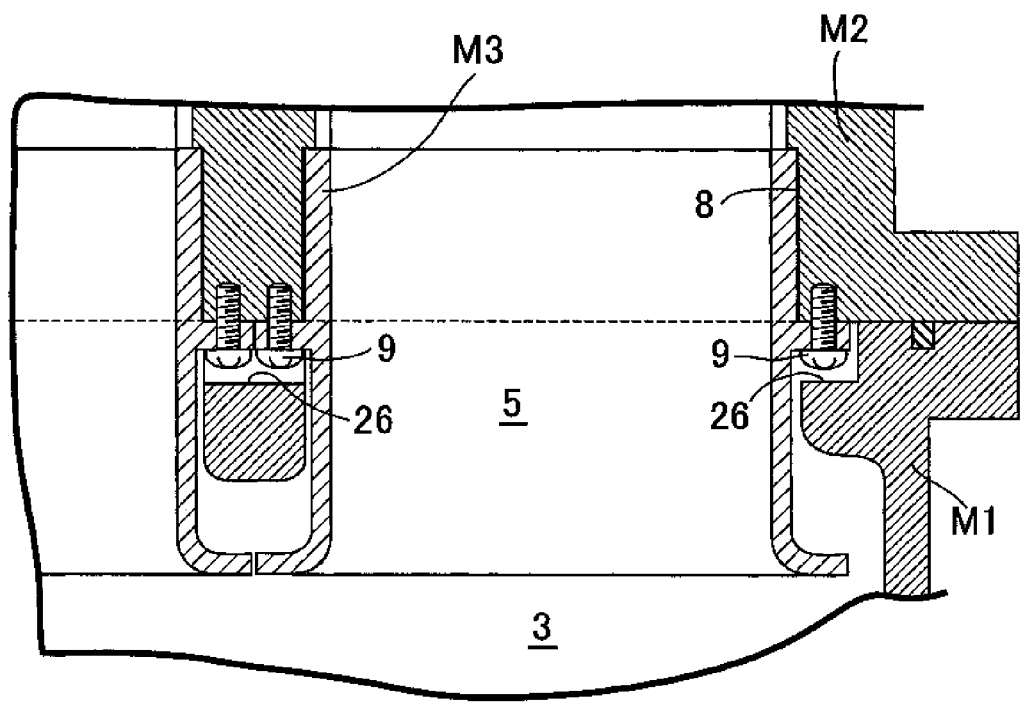
FIG. 19 is a view corresponding to FIG. 18 and showing a fourth embodiment of the present invention.

Finally, a fourth embodiment of the present invention will be described next with reference to FIG. 19.

In this fourth embodiment, the third blocks M3 are bolted to the second block M2 side with bolts 9. Counter-bore portions 26 are formed in the top face of the first block M1 to accept the heads of the bolts 9 respectively. Except for these points, the configuration of the fourth embodiment is substantially the same as that of the third embodiment. Accordingly, in FIG. 19, the parts that correspond to those of the first embodiment are given identical reference numerals. Descriptions of these parts will not be repeated. According to the fourth embodiment, the same effects as those obtained according to the third embodiment can be obtained.

The embodiments that have been described thus far are not the only forms of carrying out the present invention. Various modifications can be made in the design without departing from the scope of the present invention. Some examples of such modifications will follow. Firstly, while a first intake passage (the long intake passage 4) and a second intake passage (the short intake passage 5) have to have different equivalent flow-passage lengths from each other, the purpose may be achieved by making the two flow passages have different cross-sectional areas from each other. To be more specific, the above-mentioned effect can be achieved by making the first and the second flow passages with the same actual flow-passage length differ from each other in the cross-sectional area, that is, by making the first intake passage have a larger flow-passage area than that of the second intake passage. Secondly, the long intake passage 4 can be formed through the first, the second, the third blocks M1, M2, and M3 that are stacked into a three-layer structure. Thirdly, besides the four-cylinder engine, other multi-cylinder engines and single-cylinder engines can be equipped with the intake control system of the present invention.

What is claimed is:

1. An engine intake control system comprising:
an intake passage body attached to an engine;
a first intake passage formed in the intake passage body and having a downstream end connected to an intake port of the engine;
a second intake passage also formed in the intake passage body and having a downstream end connected to the intake port; and
a changeover valve that includes a valve shaft rotatably supported by the intake passage body, and a valve plate attached to the valve shaft, the valve plate being moved rotationally, by a rotational movement of the valve shaft, between a first changeover position, where the valve plate closes the second intake passage and allows the first intake passage to be connected to the intake port for air flow, and a second changeover position, where the valve plate closes the first intake passage and allows the second intake passage to be connected to the intake port for air flow,
wherein the valve plate is a butterfly-type valve plate including first and second valve-plate half portions that extend in opposite directions to each other from the valve shaft,
when the valve plate is at the first changeover position, a plate face, which is at one side of the valve plate, forms a part of the first intake passage, and
when the valve plate is at the second changeover position, a plate face, which is at the other side of the valve plate, forms a part of the second intake passage.

2. The engine intake control system according to claim 1, wherein when the valve plate is at the first changeover position, the first valve-plate half portion is directed to the downstream side of the first intake passage from the valve shaft and the second valve-plate half portion is directed to the upstream side of the first intake passage from the valve shaft so that the plate face, which is at one side of the valve plate, forms a part of the first intake passage, and
when the valve plate is at the second changeover position, the first valve-plate half portion is directed to the downstream side of the second intake passage from the valve shaft and the second valve-plate half portion is directed to the upstream side of the second intake passage from the valve shaft so that the plate face, which is at the other side of the valve plate, forms a part of the second intake passage.

3. The engine intake control system according to claim 1, wherein the intake passage body includes at least two separate blocks, which are a first block and a second block,
a surge chamber with an air entrance being formed on a side thereof is formed in the first block,
an upstream-side half portion of the first intake passage with an opening facing the surge chamber at an upstream end thereof is formed in the first block,
a downstream-side half portion of the first intake passage is formed in the second block,
the valve shaft is attached to the second block,
a third block including the second intake passage is disposed contiguously to the second block, an upstream end of the second intake passage being open to the surge chamber and the downstream end of the second intake passage being open to the downstream-side half portion of the first intake passage, and the valve plate closes the downstream end of the second intake passage when located at the first changeover position, and closes the downstream-side half portion of the first intake passage when located at the second changeover position.

4. The engine intake control system according to claim 3, wherein a valve seat with which the first valve-plate half portion is in contact when the valve plate is at the first changeover position is formed in the third block, and
a valve seat with which the second valve-plate half portion is in contact when the valve plate is at the second changeover position is formed in the third block.

5. The engine intake control system according to claim 3, wherein a valve seat with which the second valve-plate half portion is in contact when the valve plate is at the first changeover position is formed both in the second block and in the third block, and
a valve seat with which the first valve-plate half portion is in contact when the valve plate is at the second changeover position is formed in the second block.

6. The engine intake control system according to claim 3, wherein a funnel member is provided to form the downstream end of the second intake passage, and
the funnel member forms a part of the third block.

7. An engine intake control system comprising:
an intake passage body attached to an engine;
a first intake passage formed in the intake passage body and having a downstream end connected to an intake port of the engine;
a second intake passage formed in the intake passage body and having a downstream end connected to the intake port; and
a changeover valve that includes a valve shaft rotatably supported by the intake passage body, and a valve plate attached to the valve shaft, the valve plate being moved rotationally, by a rotational movement of the valve shaft, between a first changeover position, where the valve plate closes the second intake passage and allows the first intake passage to be connected to the intake port for air flow, and a second changeover position, where the valve plate closes the first intake passage and allows the second intake passage to be connected to the intake port for air flow,
wherein the valve plate is a butterfly-type valve plate including first and second valve-plate half portions that extend in opposite directions to each other from the valve shaft,
when the valve plate is at the first changeover position, a first plate face, which is at one side of the valve plate, forms a part of the first intake passage, and
when the valve plate is at the second changeover position, a second plate face, which is at the other side of the valve plate, forms a part of the second intake passage,
a first valve seat with which a sealing portion located on the second plate face side of the first valve-plate half portion is in contact when the valve plate is at the first changeover position is formed in the intake passage body,
a second valve seat with which a sealing portion located on the first plate face side of the second valve-plate half portion is in contact when the valve plate is at the first changeover position is formed in the intake passage body,
a third valve seat with which a sealing portion located on the first plate face side of the first valve-plate half portion is in contact when the valve plate is at the second changeover position is formed in the intake passage body,
a fourth valve seat with which a sealing portion located on the second plate face side of the second valve-plate half portion is in contact when the valve plate is at the second changeover position is formed in the intake passage body, and
in at least one of the first valve-plate half portion and the second valve-plate half portion, the sealing portion located on the first plate face side and the sealing portion located on the second plate face side are separated from each other in the thickness direction of the valve plate.

8. The engine intake control system according to claim 7, wherein when the valve plate is at the first changeover position, the first valve-plate half portion is directed to the downstream side of the first intake passage from the valve shaft and the second valve-plate half portion is directed to the upstream side of the first intake passage from the valve shaft so that the first plate face, which is at one side of the valve plate, forms a part of the first intake passage, and
when the valve plate is at the second changeover position, the first valve-plate half portion is directed to the downstream side of the second intake passage from the valve shaft and the second valve-plate half portion is directed to the upstream side of the second intake passage from the valve shaft so that the second plate face, which is at the other side of the valve plate, forms a part of the second intake passage.

9. The engine intake control system according to claim 7, wherein the sealing portion located on the first plate face side of the first valve-plate half portion is formed by a first seal lip made of an elastic material, the first seal lip being formed in the peripheral edge portion of the first plate face of the first valve-plate half portion,
the sealing portion located on the second plate face side of the first valve-plate half portion is formed by a second seal lip made of an elastic material, the second seal lip being formed in the peripheral edge portion of the second plate face of the first valve-plate half portion,
the sealing portion located on the first plate face side of the second valve-plate half portion is formed by a third seal lip made of an elastic material, the third seal lip being formed in the peripheral edge portion of the first plate face of the second valve-plate half portion, and
the sealing portion located on the second plate face side of the second valve-plate half portion is formed by a fourth seal lip made of an elastic material, the fourth seal lip being formed in the peripheral edge portion of the second plate face of the second valve-plate half portion.

10. The engine intake control system according to claim 7, wherein a tapered flow-straightening protrusion is formed at any one of the tip-end portion of the first valve-plate half portion and the tip-end portion of the second valve-plate half portion in which the two sealing portions located respectively on the first plate face side and on the second plate face side are separated from each other, the tip-end portions being the remotest part from the valve shaft, and
the tapered flow-straightening protrusion is in contact with or positioned close to the inner face of the corresponding intake passage when the valve plate is at any one of the first and the second changeover positions.

11. The engine intake control system according to claim 7, wherein the peripheral edge portions, serving as the sealing portion, of at least one of the first plate face and the second plate face are joined together at one side of the valve plate so as to be contiguous from each other.

* * * * *